United States Patent
Jeon et al.

(10) Patent No.: US 10,652,828 B2
(45) Date of Patent: May 12, 2020

(54) ELECTRONIC DEVICE FOR PROVIDING MODE SWITCHING AND A METHOD THEREOF

(71) Applicant: Samsung Electronics Co., Ltd., Gyeonggi-do (KR)

(72) Inventors: Jin-Young Jeon, Gyeonggi-do (KR); Jae-Joon Seo, Gyeonggi-do (KR); Jong-Gab Park, Gyeonggi-do (KR); Sang-Min Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/111,331

(22) Filed: Aug. 24, 2018

(65) Prior Publication Data

US 2019/0069244 A1     Feb. 28, 2019

(30) Foreign Application Priority Data

Aug. 25, 2017   (KR) .......................... 10-2017-0108229

(51) Int. Cl.
*H04W 52/02*     (2009.01)
*G01C 21/12*     (2006.01)
*H04B 1/3827*    (2015.01)

(52) U.S. Cl.
CPC ........ *H04W 52/0254* (2013.01); *G01C 21/12* (2013.01); *H04B 1/385* (2013.01); *H04W 52/0274* (2013.01)

(58) Field of Classification Search
CPC .......... H04W 52/0254; H04W 52/0274; G01C 21/12; H04B 1/385

(Continued)

(56) References Cited

U.S. PATENT DOCUMENTS 8,234,512 B2 *   7/2012   Mucignat .............. G06F 1/3203
                                                      713/323
8,392,735 B2 *   3/2013   Mucignat .............. G06F 1/3203
                                                      713/323

(Continued)

FOREIGN PATENT DOCUMENTS

KR    10-2017-0020148 A    2/2017
KR    10-2017-0076500 A    7/2017

(Continued)

OTHER PUBLICATIONS

International Search Report dated Nov. 20, 2018.

*Primary Examiner* — Julio R Perez
(74) *Attorney, Agent, or Firm* — Cha & Reiter, LLC

(57) ABSTRACT

According to various embodiments, an electronic device includes a housing configured to house a battery; a display configured to be disposed in the housing, to be exposed through a portion of the housing, and to be electrically connected to the battery; a motion detection sensor circuit configured to be disposed in the housing and to be electrically connected to the battery; a power management circuit configured to be disposed in the housing and to be electrically connected to the battery; and a processor configured to be functionally or electrically connected to the motion detection sensor circuit and the display and to be electrically connected to the power management circuit through a switch that is turned on when the processor is in a first mode and turned off when the processor is in a second mode, wherein, in the second mode, the motion detection sensor circuit detects a motion associated with the electronic device, and provides image data to the display in response to the detection of the motion. Other embodiments are also possible.

19 Claims, 18 Drawing Sheets

(58) Field of Classification Search
USPC .......................................................... 455/574
See application file for complete search history.

(56) References Cited

U.S. PATENT DOCUMENTS

| | | | |
|---|---|---|---|
| 9,380,249 B2* | 6/2016 | Johnson | H04N 5/4403 |
| 2006/0161377 A1 | 7/2006 | Rakkola et al. | |
| 2015/0301574 A1* | 10/2015 | Kim | G06F 1/163 |
| | | | 345/156 |
| 2015/0382086 A1* | 12/2015 | Kim | H04W 4/70 |
| | | | 340/870.07 |
| 2016/0155426 A1 | 6/2016 | Gunn et al. | |
| 2016/0379547 A1* | 12/2016 | Okada | G09G 5/14 |
| | | | 345/428 |
| 2017/0011210 A1 | 1/2017 | Cheong et al. | |
| 2017/0045918 A1 | 2/2017 | Han et al. | |
| 2017/0185856 A1* | 6/2017 | Park | G06K 9/00892 |
| 2019/0346905 A1* | 11/2019 | Song | H04W 52/0274 |

FOREIGN PATENT DOCUMENTS

| | | |
|---|---|---|
| WO | 2011/028326 A1 | 3/2011 |
| WO | 2013/003032 A1 | 1/2013 |

* cited by examiner

ELECTRONIC DEVICE FOR PROVIDING MODE SWITCHING AND A METHOD THEREOF

CROSS-REFERENCE TO RELATED APPLICATION

This application is based on and claims priority under 35 U.S.C. § 119 of Korean Patent Application No. 10-2017-0108229, filed on Aug. 25, 2017, in the Korean Intellectual Property Office, the disclosure of which is incorporated herein by reference in its entirety.

BACKGROUND

1. Field

Various embodiments of the present disclosure generally relate to a mode switching method and an electronic device providing the same.

2. Description of the Related Art

As portable devices such as smartphones have become commonplace, the widespread use of wearable electronic devices (for example, smart watches) that work in conjunction with smartphones is also rapidly increasing. These wearable electronic devices may be connected to smartphones through wired or wireless communication to provide a user with various function(s) or operation(s). Wearable devices may provide conveniences. For example, the user may be alerted to new messages by simply looking at his or her smart watch, rather than having to remove his or her smartphone from a pocket. Due to such conveniences, the spread of wearable electronic devices such as smart watches is gradually increasing.

SUMMARY

Because wearable electronic devices may be relatively small in size, batteries in the wearable electronic devices may also be limited in size. Even when the wearable electronic device is simply used as a clock or a watch, a processor of the wearable electronic device in a power-on state consuming a large amount of power, so that it is difficult to use the wearable electronic device for a long time.

In addition, in these wearable electronic devices, in order to provide a function using one of the sensors of the wearable device (for example, displaying the time when the wearable electronic device detects wrist lifting by the user), the processor of the wearable electronic device must operate to collect and process data generated by the sensor, which may further reduce battery life.

According to various embodiments, an electronic device includes a housing configured to house a battery; a display configured to be disposed in the housing, to be exposed through a portion of the housing, and to be electrically connected to the battery; a motion detection sensor circuit configured to be disposed in the housing and to be electrically connected to the battery; a power management circuit configured to be disposed in the housing and to be electrically connected to the battery; and a processor configured to be functionally or electrically connected to the motion detection sensor circuit and the display, and to be electrically connected to the power management circuit through a switch that is turned on when the processor is in a first mode and turned off when the processor is in a second mode, wherein, in the second mode, the motion detection sensor circuit detects a motion associated with the electronic device and provides image data to the display in response to the detection of the motion.

According to various embodiments, an electronic device includes a housing; a display configured to be disposed in the housing and to be exposed through a portion of the housing; a motion detection sensor circuit configured to be disposed in the housing; and a processor configured to be functionally connected to the motion detection sensor circuit and the display, to be turned on in a first mode, and to be turned off in a second mode, wherein, in the second mode, the motion detection sensor circuit detects a first motion associated with the electronic device, and the display displays data in response to the detection of the first motion.

According to various embodiments, when only some of functions of a wearable electronic device (e.g., time display or the like) are used, power consumption may be minimized by turning off the processor of the wearable electronic device, thereby prolonging battery life.

According to various embodiments, to turn a screen of the wearable electronic device off/on using the sensor of the wearable electronic device, communication between the sensor and the display may be performed. Accordingly, the screen may be quickly turned on/off based on sensor information.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
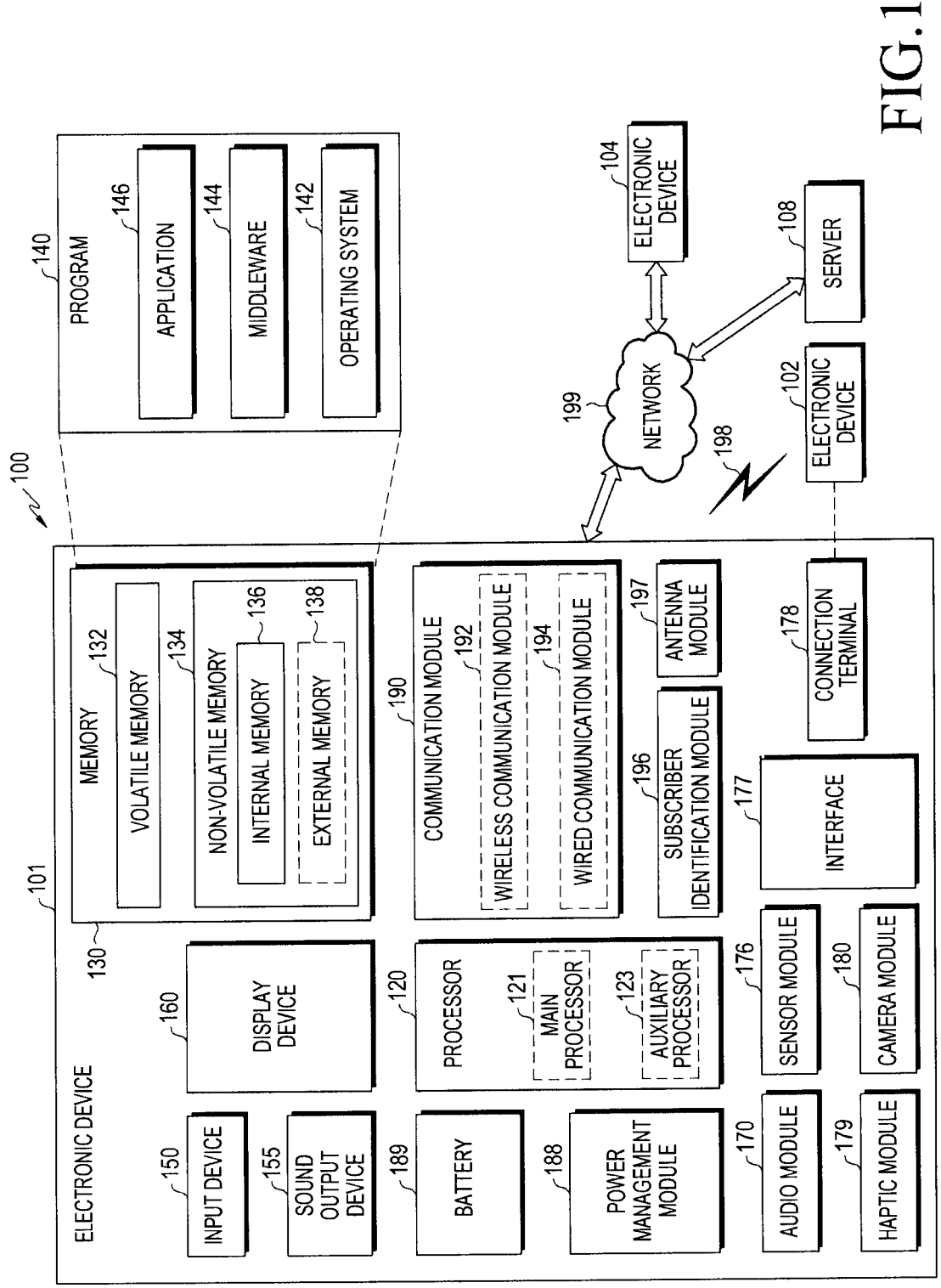
FIG. 1 is a block diagram illustrating an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 through a first network (e.g., short range wireless communication) or may communicate with an electronic device 104 or a server 108 through a second network 199 (e.g., long distance wireless communication). According to one embodiment, the electronic device 101 may communicate with the electronic device 104 through the server 108. According to one embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. According to some embodiments, at least one (e.g., the display device 160 or the camera module 180) of the above-described components of the electronic device 101 may be omitted or other components may be added to the electronic device 101. In some embodiments, some of the components may be integrated and implemented, such as the sensor module 176 (e.g., a fingerprint sensor, an iris sensor, or an illuminance sensor) which is embedded in the display device 160.

The processor 120 may control at least one other component (e.g., hardware or software component) of the electronic device 101 connected to the processor 120 by driving, for example, software (e.g., the program 140), and may perform various data processing and operations. The processor 120 may load or process commands or data received from the other components (e.g., the sensor module 176 or the communication module 190) into a volatile memory 132, and may store the resulting data in a non-volatile memory 134. According to one embodiment, the processor 120 may include a main processor 121 (e.g., central processing unit or application processor) and an auxiliary processor 123 (e.g., a graphics processing device, an image signal processor, a sensor hub processor, or a communications processor) that is operated independently of the main processor 121 and additionally or alternatively uses lower power than the main processor 121 or is specialized for a designated function. Here, the auxiliary processor 123 may be embedded and operated separately from the main processor 121. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. 101.

In this case, the auxiliary processor 123 may control at least some of functions or states associated with at least one component (e.g., the display device 160, the sensor module 176, or the communication module 190) of the electronic device 101, on behalf of the main processor 121 while the main processor 121 is, for example, in an inactive state (e.g., sleep) or together with the main processor 121 while the main processor 121 is in an active state (e.g., application performing). According to one embodiment, the auxiliary processor 123 (e.g., an image signal processor or a communication processor) may be implemented as some components of other components (e.g., the camera module 180 or the communication module 190) that are functionally related thereto. The memory 130 may store various data, which is used by the at least one component (e.g., the processor 120 or the sensor module 176) of the electronic device 101, for example, input data or output data for software (e.g., the program 140) and the related commands. The memory 130 may include the volatile memory 132 or the non-volatile memory 134.

The program 140 may be software stored in the memory 130 and may include, for example, an operating system 142, a middleware 144, or an application 146.

The input device 150 may be a device for receiving commands or data to be used for the component (e.g., the processor 120) of the electronic device 101 from the outside (e.g., a user) of the electronic device 101, and may include, for example, a microphone, a mouse, or a keyboard.

The sound output device 155 may be a device for outputting a sound signal to the outside of the electronic device 101, and may include, for example, a speaker for general use such as multimedia reproduction or recording reproduction and a receiver used exclusively for receiving calls. According to one embodiment, the receiver may be formed integrally with or separately from the speaker.

The display device 160 may be a device for visually providing information to a user of the electronic device 101 and may include, for example, a display, a hologram device, a projector, or a control circuitry for controlling a device. According to one embodiment, the display device 160 may include touch circuitry or a pressure sensor capable of measuring the intensity of the pressure on a touch.

The audio module 170 may bidirectionally convert sound and electrical signals. According to one embodiment, the audio module 170 may acquire sound through the input device 150, or may output sound through an external electronic device (e.g., the electronic device 102 (e.g., a speaker or a headphone)) that is connected to the sound output device 155 or the electronic device 101 via a wire or wirelessly.

The sensor module 176 may generate an electrical signal or a data value corresponding to an internal operating state (e.g., power or temperature) of the electronic device 101 or an external environmental condition thereof. The sensor module 176 may include, for example, a gesture sensor, a gyro sensor, a barometric sensor, a magnetic sensor, an acceleration sensor, a grip sensor, a proximity sensor, a color sensor, an infrared (IR) sensor, a biosensor, a temperature sensor, a humidity sensor, or an illuminance sensor.

The interface 177 may support a designated protocol and may be connected to an external electronic device (e.g., the electronic device 102) via a wire or wirelessly. According to one embodiment, the interface 177 may include a high definition multimedia interface (HDMI), a universal serial bus (USB) interface, an SD card interface, or an audio interface.

A connection terminal 178 may include a connector capable of physically connecting the electronic device 101 and an external electronic device (e.g., the electronic device 102), for example, an HDMI connector, a USB connector, an SD card connector, or an audio connector (e.g., a headphone connector).

The haptic module 179 may convert an electrical signal into a mechanical stimulus (e.g., vibration or movement) or an electrical stimulus that can be perceived by a user through tactile or kinesthetic sensations. The haptic module 179 may include, for example, a motor, a piezoelectric element, or an electrical stimulation device.

The camera module 180 may capture a still image and a moving image. According to one embodiment, the camera module 180 may include one or more lenses, an image sensor, an image signal processor, or a flash.

The power management module 188 may be a module for managing power supplied to the electronic device 101, and may be configured as at least a portion of, for example, a power management integrated circuit (PMIC).

The battery 189 may be a device for supplying power to at least one component of the electronic device 101 and may include, for example, a non-rechargeable primary battery, a rechargeable secondary battery, or a fuel cell.

The communication module 190 may support establishment of a wired or wireless communication channel between the electronic device 101 and an external electronic device (e.g., the electronic device 102, the electronic device 104, or the server 108) and communication performance through the established communication channel. The communication module 190 may include one or more communication processors that support wired communication or wireless communication, which is operated independently of the processor 120 (e.g., an application processor). According to one embodiment, the communication module 190 may include a wireless communication module 192 (e.g., a cellular communication module, a short range wireless communication module, or a global navigation satellite system (GNSS) communication module) or a wired communication module 194 (e.g., a local area network (LAN) communication module or a power line communication module). Using the corresponding communication module among them, the communication module 190 may communicate with an external electronic device through the first network e.g., a short range communication network such as Bluetooth, Wi-Fi direct, or infrared data association (IrDA)) or the second network 199 (e.g., a long distance communication network such as a cellular network, the Internet, or a computer network (e.g., LAN or WAN)). The various types of communication modules 190 described above may be implemented as a single chip or separate chips.

According to one embodiment, the wireless communication module 192 may use user information stored in the subscriber identification module 196 to identify and authenticate the electronic device 101 within the communication network.

The antenna module 197 may include one or more antennas for transmitting or receiving signals or power to or from the outside. According to one embodiment, the communication module 190 (e.g., the wireless communication module 192) may transmit or receive signals to or from an external electronic device via an antenna suitable for the corresponding communication method.

Some of the above-described components may be coupled to each other through a communication method (e.g., bus, general purpose input/output (GPIO), serial peripheral interface (SPI), or mobile industry processor interface (MIPI)) between peripheral devices to exchange signals (e.g., commands or data) therebetween.

According to one embodiment, the commands and data may be transmitted or received between the electronic device 101 and the external electronic device 104 via the server 108 connected to the second network 199. Each of the electronic devices 102 and 104 may be the same or a different kind of device as or from the electronic device 101. According to one embodiment, all or some of the operations executed in the electronic device 101 may be executed in another electronic device or a plurality of external electronic devices. According to one embodiment, when the electronic device 101 is required to perform any function or service automatically or by a request, the electronic device 101 may request at least partial function associated with the function or the service from an external electronic device additionally or in place of executing the function or the service by itself. The external electronic device receiving the request may execute the requested function or additional function, and may transmit the execution result to the electronic device 101. The electronic device 101 may process the received result as is or additionally, and may provide the requested function or service. For this, for example, a cloud computing technology, a distributed computing technology, or a client-server computing technology may be used.

Figure 2:
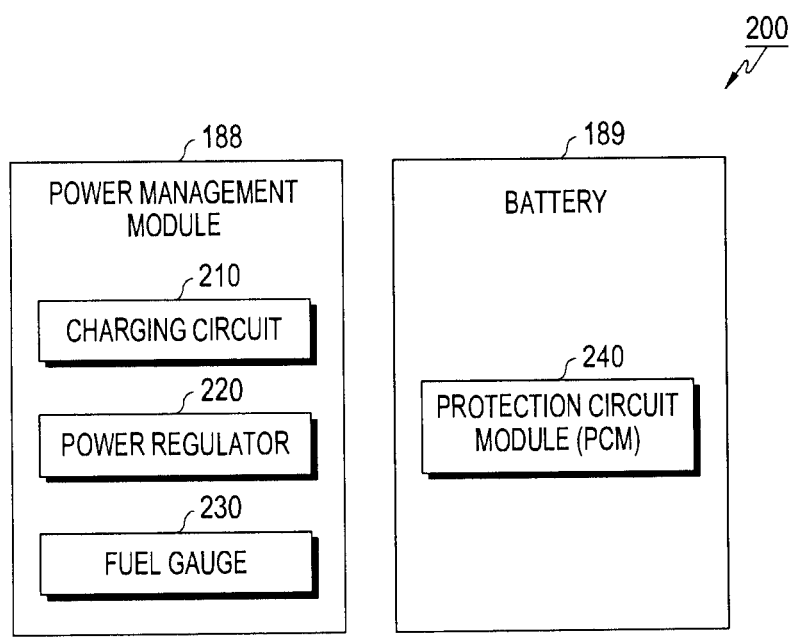
FIG. 2 is a block diagram illustrating a power management module and a battery according to an embodiment.

FIG. 2 is a block diagram 200 illustrating the power management module 188 and the battery 189 according to an embodiment. Referring to FIG. 2, the power management module 188 may include a charging circuit 210, a power regulator 220, or a fuel gauge 230. The charging circuit 210 may charge the battery 189 using power supplied from an external power source connected to the electronic device 101. According to one embodiment, the charging circuit 210 may select a charging method (e.g., normal charging or rapid charging) based on the type of the external power source (e.g., a power adapter, a USB, or a wireless charger), the magnitude (e.g., about 20 watts or more) of power that can be supplied from the external power source, and/or attributes of the battery 189, and may charge the battery 189 using the selected charging method. The external power source may be connected through the connection terminal 178 via a wire or may be wirelessly connected through the antenna module 197.

The power regulator 220 may generate a plurality of power signals having different voltages or different current levels by adjusting the voltage level or the current level of the power supplied from the external power source or the battery 189. The power regulator 220 may adjust the power of the external power source or the battery 189 to a voltage or current level suitable for each of the components included in the electronic device 101. According to one embodiment, the power regulator 220 may be implemented as a low dropout (LDO) regulator or a switching regulator.

The fuel gauge 230 may measure usage state information (e.g., capacity of the battery, number of charge/discharge cycles, voltage, or temperature) of the battery 189.

The power management module 188 may determine charging state information (e.g., lifetime of the battery 189, over voltage, low voltage, over current, over charging, over discharging, overheating, short-circuit, or swelling) associated with the charging of the battery 189. The charging state information may be determined based on at least a portion of the measured usage state information generated by the fuel gauge 230. The power management module 188 may also ascertain whether the battery 189 is in an abnormal state or a normal state based at least a portion of the determined charging state information, and then may adjust (e.g., reducing the charging current or voltage or stopping charging) the charging of the battery 189 when the battery 189 is ascertained to be in the abnormal state. According to one embodiment, at least some of the functions of the power management module 188 may be performed by an external control device (e.g., the processor 120).

According to one embodiment, the battery 189 may include a protection circuit module (PCM) 240. The PCM 240 may perform various functions (e.g., a pre-shutdown function) to prevent degradation or burn-out of the battery 189. The PCM 240 may be additionally or alternatively configured as at least a portion of a battery management system (BMS) that performs cell balancing, battery capacity measurement, charging/discharging count measurement, temperature measurement, or voltage measurement.

According to one embodiment, at least a portion of the usage state information or the charging state information of the battery 189 may be measured using the corresponding sensor (e.g., temperature sensor) incorporated within the fuel gauge 230, the power management module 188, and/or the sensor module 176. In this case, according to one embodiment, the corresponding sensor (e.g., temperature sensor) of the sensor module 176 may be included as a portion of the PCM 240, or may be disposed in the vicinity of the battery 189 as a separate device from the PCM 240.

The electronic device according to various embodiments disclosed herein may be various types of devices. The electronic device may, for example, include at least one of a portable communication device (e.g., smartphone) a computer device, a portable multimedia device, a portable medical device, a camera, a wearable device, and a home appliance. The electronic device according to one embodiment is not limited to the above described devices.

Various embodiments and the terms used herein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include the plural expression unless they are definitely different in a context. In the present disclosure, the expression "A or B," "at least one of A and/or B," or "at least one of A, B, and/or C" may include all possible combinations of the items listed. The expression "a first," "a second," "the first," or "the second" may refer to corresponding components without implying an order of importance, and are used merely to distinguish each component from the others without unduly limiting the components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit consisting of hardware, software, or firmware, and may, for example, be used interchangeably with the term "logic," "logical block," "component," "circuit," or the like. The "module" may be an integrated component, or a portion thereof for performing one or more functions. For example, the module may be implemented by an application-specific integrated circuit (ASIC).

Various embodiments as described herein may be implemented by software (e.g., program 140) including an instruction stored in machine-readable storage media (e.g., internal memory 136 or external memory 138). The machine is a device that calls the stored instruction from the storage media and can operate according to the called instruction, and may include an electronic device (e.g., electronic device 101) according to the disclosed embodiments. The instruction, when executed by a processor (e.g., processor 120), may cause the processor to directly execute a function corresponding to the instruction or cause other elements to execute the function under the control of the processor. The instruction may include code made by a compiler or code executable by an interpreter. The machine-readable storage media may be provided in the form of non-transitory storage media. Here, the term "non-transitory" only means that the storage media is tangible and does not include signals, irrespective of whether data is semi-permanently or transitorily stored in the storage media.

According to one embodiment, a method according to various embodiments disclosed herein may be included in a computer program product. The computer program product may be traded between a seller and a purchaser as a commodity. The computer program product may be distributed in the form of a machine-readable storage medium (e.g., compact disc read only memory (CD-ROM)) or distributed online through an application store (e.g., PlayStore™). In the case of online distribution, at least a portion of the computer program product may be at least temporarily stored in a storage medium such as a manufacturer's server, a server of an application store, or a memory of a relay server, or may be provisionally created.

Each component (e.g., module or program) according to various embodiments may be composed of a single entity or a plurality of entities. Some subcomponents of the above-described corresponding subcomponents may be omitted, or other subcomponents may be further included in various embodiments. Alternatively or additionally, some components (e.g., modules or programs) may be integrated into one entity to perform the function performed by each corresponding component prior to the integration in the same or similar manner. According to various embodiments, operations performed by modules, programs, or other components may be performed in a sequential, parallel, iterative, or heuristic manner. Alternatively, at least some operations may be performed in a different order or omitted, or other operations may be added.

Figure 3:
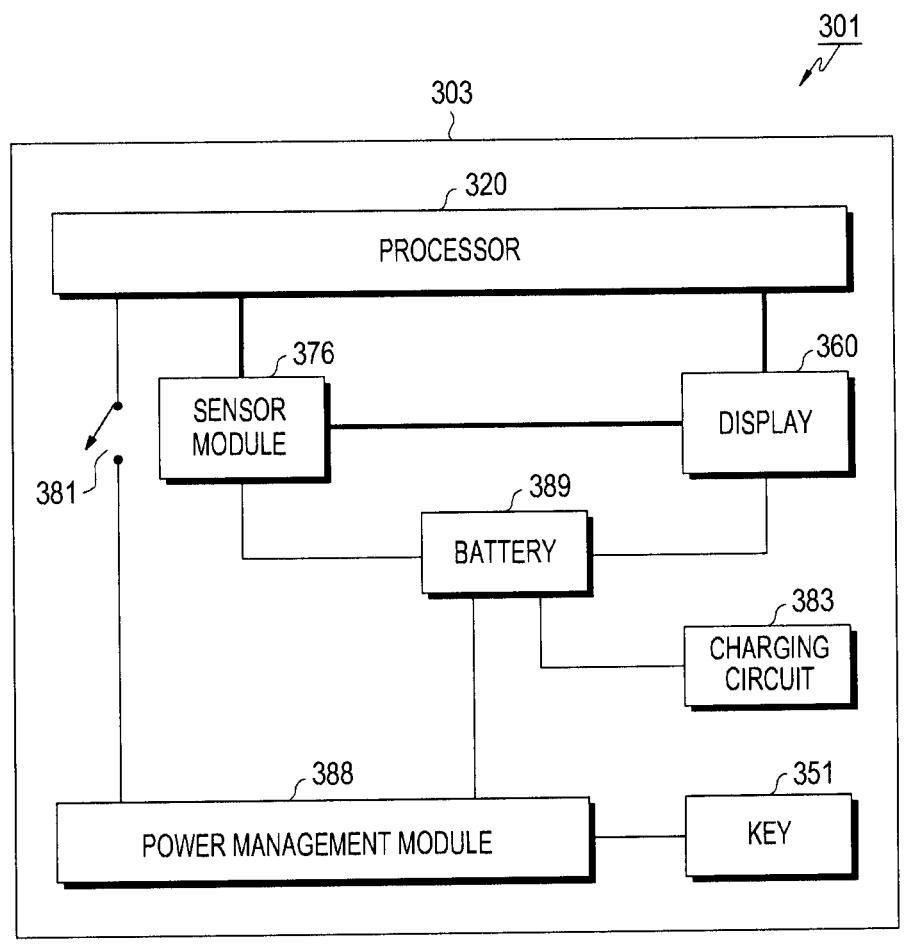
FIG. 3 is a block diagram illustrating an electronic device according to an embodiment.

FIG. 3 is a block diagram illustrating an electronic device according to an embodiment.

An electronic device 301 (e.g., the electronic device 101) may include a housing 303, a processor 320 (e.g., the processor 120), a key 351, a display (e.g., the display device 160 or a display circuit/IC), a sensor module 376 (e.g., the sensor module 176, a sensor circuit/IC, or a motion detection sensor circuit), a switch 381, a charging circuit 383 (e.g., the charging circuit 210 or a charging IC), a power management module 388 (e.g., the power management module 188 or a power management circuit), and a battery 389 (e.g., the battery 189).

According to one embodiment, in the electronic device 301, at least one of these components may be omitted or other components (e.g., the communication module 190 or the memory 130) may be added.

The processor 320 may be disposed in the housing 303 and may be functionally or electrically coupled to the sensor module 376 and the display 360. The processor 320 may be functionally or electrically coupled to the power management module 388. The processor 320 may be configured to be in a state of being turned on (or powered on) in a first mode (or normal mode) or to be in a state of being turned off (or powered off) in a second mode (or watch only mode).

According to one embodiment, the processor 320 may be functionally or electrically connected to the power management module 388 through the switch 381 (e.g., a hardware switch or a software switch). The switch 381 may be in an ON state (or closed state) when the processor 320 is in the first mode and is in an OFF state (or opened state) when the processor 320 is in the second mode.

In the first mode, the processor 320 may transmit, to the display 360, image data (e.g., home screen, application screen, watch face image and/or biometric information-related image), time-related data (e.g., watch face image, current time information, and/or mode/image identification information associated with time display), and/or biometric information-related data (e.g., type of exercise, exercise time, remaining time, travel distance, consumed calories, user's heart rate, stress level due to exercise, and/or exercise progress) periodically or according to the occurrence of an event (e.g., wake up of the processor 320, activation/turn on of the display 360, message/call/data reception, user input, application operation, reception of sensor information, expiration of a timer, etc.).

According to one embodiment, in the first mode, the processor 320 may receive information associated with a first motion from the sensor module 376. The processor 320 may transmit, to the display 360, the image data, the time-related data, and/or the biometric information-related data based on the information associated with the first motion (or in response to the reception of the information associated with the first motion). According to one embodiment, the processor 320 may activate the display 360 based on the information associated with the first motion (or in response to the reception of the information associated with the first motion).

According to one embodiment, the processor 320 may be automatically turned off (or shut down) within/after a predetermined time period from a time point when the image data, the time-related data, and/or the biometric information-related data are transmitted to the display 360 or immediately after transmitting the same.

In the first mode, the processor 320 may receive information associated with a second motion from the sensor module 376. The processor 320 may deactivate the display 360 based on the information associated with the second motion (or in response to the reception of the information associated with the second motion). The processor 320 may be automatically turned off within/after a predetermined time period from a time point when the display 360 is deactivated or immediately after the display 360 is deactivated.

According to one embodiment, the first motion may include an operation of raising the user's wrist/arm or the electronic device 301 (i.e. raising the wrist/arm or electronic device 301 away from the ground), and the second motion may include an operation of lowering the user's wrist/arm or the electronic device 301 (or lowering the wrist/arm or electronic device 301 toward the ground).

In a sleep mode or an inactive/deactivated state, the component in question may be in a state where it cannot perform at least some of the functions that it can perform in normal mode or active state.

According to one embodiment, in the normal mode or the active/activated state, the display 360 may be in a power/ display ON state. In the sleep mode or the inactive/deactivated state, the display 360 may be in a power/display OFF state.

According to one embodiment, in the second mode, the power management module 388 may cut off the power supply to the processor 320 through the switch 381 disposed on power supply wiring between the power management module 388 and the processor 320. According to one embodiment, the switch 381, which controls the power supply to the processor 320, may be located within the power management module 388.

According to one embodiment, changes from the first mode to the second mode and from the second mode to the first mode may be performed according to whether a preset mode change condition is satisfied. For example, whether the mode change condition is satisfied may be determined based on a user input (e.g., pressing/input/selection of the key 351 (e.g., a power key) or touch/input/selection of a button on a screen), a connection to an external power source (e.g., detection of VBUS voltage for power supply), and/or a comparison between a state value (e.g., remaining battery amount/level, internal temperature, or internal element temperature) of the electronic device 301 and a threshold value.

According to one embodiment, when the remaining battery amount/level of the electronic device 301 is less than or equal to the threshold value, the processor 320 may determine that the mode change condition is satisfied.

According to one embodiment, the mode change condition may include a case in which the motion of the electronic device 301 detected through a motion sensor (e.g., at least one or more of a gyro sensor, an acceleration sensor, an inertial measurement unit (IMU), and a gyro compass) of the sensor module 376 has a magnitude greater than or equal to the threshold value, a case in which the location of the electronic device 301 detected through a location sensor (e.g., a GPS sensor) of the sensor module 376 is within a predetermined region/area, a case in which the motion of the electronic device 301 indicates a preset gesture, a case in which a user input occurs through a key/button, a microphone, or a display (or a touch panel), a case in which a preset event (e.g., an incoming call, an incoming message, etc.) occurs in the electronic device 301, and/or a case in which the state of certain component(s) of the electronic device 301 is switched (e.g., a case in which the processor 320, a communication processor (CP), or another component is switched from the wake up state to the sleep state).

For the change from the first mode to the second mode, or when an event associated with the mode change occurs (e.g., when satisfaction of the mode change condition occurs), the processor 320 may transmit the image data, the time-related data, and/or the biometric information-related data to the sensor module 376 or the display 360.

According to one embodiment, for the change from the first mode to the second mode, or when an event associated with the mode change occurs (e.g., when satisfaction of the mode change condition occurs), the processor 320 may activate the sensor module 376 and/or the display 360.

According to one embodiment, for the change from the first mode to the second mode, or when an event associated with the mode change occurs (e.g., when satisfaction of the mode change condition occurs), the processor 320 may change firmware for driving the sensor module 376 from a first version (e.g., full version) to a second version (e.g., lite version) having limited functionality.

According to one embodiment, in order to maximize an available memory of the sensor module 376 and/or minimize current consumption, the second version of the firmware may deactivate at least a portion (e.g., at least one of GPS function, biosensor function, and heart rate sensor function) of the functions of the sensor module 376 which is activated in the first version of the firmware.

According to one embodiment, the processor 320 may store the second version of the firmware in an internal memory of the sensor module 376. Depending on the command from the processor 320 or the default setting of the sensor module 376, the sensor module 376 may load the second version of the firmware through a booting process.

According to one embodiment, the processor 320 may select the second version of the firmware from among the first version of the firmware and the second version of the firmware, which were previously stored in the memory (e.g., the memory 130) of the electronic device 301. The processor may then store the selected firmware in the internal memory of the sensor module 376.

According to one embodiment, the processor 320 may delete the first version of the firmware stored in the internal memory of the sensor module 376, and then may store the second version of the firmware in the internal memory of the sensor module 376.

According to one embodiment, for changing from the second mode to the first mode, or when an event associated with the mode change occurs (e.g., when satisfaction of the mode change condition occurs), the processor 320 may perform a normal booting process.

At least a portion of the display 360 may be disposed in the housing 303 and may be exposed through a portion of the housing 303. The display 360 may be electrically connected to the rechargeable battery 389. The display 360 may be configured to communicate directly with the sensor module 376.

In the first mode, the display 360 may receive the image data, the time-related data, and/or the biometric information-related data from the processor 320. The display 360 may display the watch face image and/or the biometric information-related data based on at least a portion of the image data, the time-related data, and/or the biometric information-related data.

According to one embodiment, the watch face image may include a clock face image (e.g., face and at least one of letters, numbers, symbols, images, etc., formed on the face) and at least one indicator image, such as an hour hand image, a minute hand image, and/or a second hand image.

According to one embodiment, the display 360 may be activated or deactivated by signal/information (e.g., a wakeup signal, a sleep signal, information associated with the first motion, or information associated with the second motion) from the processor 320 or by the expiration of a timer. The display 360 may be automatically deactivated after a predetermined time period from a time point when the signal/information are received from the processor 320.

According to one embodiment, in the second mode, the display 360 may receive the image data, the time-related data, and/or the biometric information-related data from the sensor module 376. The display 360 may display the watch face image and/or the biometric information-related data based on at least a portion of the image data and the time-related data.

According to one embodiment, in the second mode, the display 360 may be activated or deactivated by a signal/command/information (e.g., a wake up signal, a sleep signal, information associated with the first motion, information associated with the second motion, display driver IC (DDI) ON command, or DDI OFF command) from the sensor module 376 or by the expiration of the timer.

According to one embodiment, in the second mode, the display 360 may display the watch face image and/or the biometric information-related data based on at least a portion of the image data, the time-related data, and/or the biometric information-related data which are stored in the internal memory of the display, depending on the signal/command/information (e.g., a wake up signal, a sleep signal, information associated with the first motion, information associated with the second motion, DDI ON command, or DDI OFF command) from the sensor module 376 or depending on the expiration of the timer.

According to one embodiment, the display 360 may adjust screen brightness based on commands of the processor 320 associated with the screen brightness or illuminance information received from the sensor module 376. For example, the display 360 may receive an illuminance level from the processor 320 or the sensor module 376 to adjust the screen brightness. By way of another example, the display 360 may adjust the screen brightness based on a table indicating a brightness value for each ambient illuminance stored in the internal memory.

The sensor module 376 may be disposed in the housing 303 and may be electrically connected to the rechargeable battery 389. The sensor module 376 may be configured to communicate directly with the display 360.

According to one embodiment, the sensor module 376 may include an inertial measurement unit (IMU), a processor connected to the IMU, and a memory connected to the processor.

The sensor module 376 may detect the motion of the electronic device 301 using at least one of an IMU, a gyro sensor, an acceleration sensor, and a gyro compass. The sensor module 376 may transmit information associated with the motion to the processor 320 in the first mode, and may transmit the information associated with the motion to the display 360 in the second mode.

According to one embodiment, the sensor module 376 may measure a biometric signal from the user using a health sensor, a biosensor, or a heart rate monitor (HRM). The sensor module 376 or the processor 320 may derive the biometric information indicating the psychological state or physical condition of the user from the measured biometric signal. The biometric signal may include an electric signal (e.g., an electrocardiogram signal, a pulse wave signal, etc.) output from the biosensor, and the biometric information may include at least one of user's identification information, physical information, emotion information, health information, disease information, exercise information, activity information, stress information, and sleep information. The sensor module 376 may transmit information associated with the biometric signal to the processor 320 in the first mode and may transmit the information associated with the biometric signal to the display 360 in the second mode.

According to one embodiment, the sensor module 376 may detect ambient illuminance using the illuminance sensor. For example, the sensor module 376 may transmit information associated with the ambient illuminance to the processor 320 in the first mode and may transmit the information associated with the ambient illuminance to the display 360 in the second mode.

The charging circuit 383 may charge the battery 389 using power supplied through a VBUS from an external power source.

The power management module 388 may adjust the power of the battery 389 to a voltage or current level suitable for each of the components included in the electronic device 301. For example, the power management module 388 may provide the adjusted power to the processor 320.

The power management module 388 may measure at least one of the remaining amount of the battery 389 and the voltage, the current, or the temperature during charging. According to one embodiment, in the second mode, some functions of the power management module 388 (e.g., measuring at least one of the remaining amount of the battery 389 and the voltage, the current, or the temperature during charging) may be performed in the sensor module 376. According to one embodiment, the power management module 388 may be turned off in the second mode. According to one embodiment, when an input of the key 351 is detected, the power management module 388 may be turned on, thereby also turning on the processor 320.

Each of the display 360 and the sensor module 376 may include a power regulator (e.g., the power regulator 220) for adjusting the power of the battery 389 to a voltage or current level suitable for the display 360 and the sensor module 376.

According to various embodiments, the electronic device 301 (e.g., the electronic device 101) may include the housing 303; the rechargeable battery 389 (e.g., the battery 189) configured to be disposed in the housing 303; the display 360 (e.g., the display 160 or a display circuit/IC) configured to be disposed in the housing 303, to be exposed through a portion of the housing 303, and to be electrically connected to the battery 389; the motion detection sensor circuit 376 (e.g., the sensor module 176 or sensor IC) configured to be disposed in the housing and to be electrically connected to the battery 389; the power management circuit 388 (e.g., the power management circuit 188) configured to be disposed in the housing 303 and to be electrically connected to the battery 389; and the processor 320 configured to be functionally or electrically connected to the motion detection sensor circuit 376 and the display 360 and to be electrically connected to the power management circuit 388 through the switch 381 that is turned on when the processor is in a first mode and turned off when the processor 320 (e.g., the processor 120) is in a second mode, wherein the motion detection sensor circuit 376 detects a motion associated with the electronic device 301 in the second mode and provides image data to the display 360 in response to the detection of the motion.

According to various embodiments, the electronic device 301 may include the housing 303; the display 360 configured to be disposed in the housing 303 and to be exposed through a portion of the housing 303; the motion detection sensor circuit 376 configured to be disposed in the housing 303; and the processor 320 configured to be functionally or electrically connected to the motion detection sensor circuit 376 and the display 360, to be turned on in a first mode, and to be turned off in a second mode, wherein, in the second mode, the motion detection sensor circuit 376 detects a first motion associated with the electronic device 301 and provides image data to the display 360 in response to the detection of the first motion.

According to various embodiments, the electronic device 301 may include the housing 303, the display configured to be disposed in the housing 303 and to be exposed through a portion of the housing 303, the motion detection sensor circuit 376 configured to be disposed in the housing 303, and the processor 320 configured to be functionally or electrically connected to the motion detection sensor circuit 376 and the display 360, to be turned on in a first mode, and to be turned off in a second mode, wherein, in the second mode, the motion detection sensor circuit 376 detects a first motion associated with the electronic device 301 and the display 360 displays data (e.g., image data, time-related data, and/or biometric information-related data) in response to the detection of the first motion.

According to various embodiments, in the second mode, the display 360 may display an image using the data/image data.

According to various embodiments, the motion detection sensor circuit 376 may include an inertial measurement unit (IMU), another processor functionally or electrically connected to the IMU, and a memory functionally or electrically connected to the processor.

According to various embodiments, the electronic device 301 may further include at least one connection structure connected to the housing 303 so that the electronic device 301 can be worn by a user of the electronic device.

According to various embodiments, the electronic device 301 may be a smart watch.

According to various embodiments, the data/image data may include a watch face image.

According to various embodiments, information associated with the motion detected by the motion detection sensor circuit 376 in the first mode may be transmitted to the processor 320, and information associated with the motion detected by the motion detection sensor circuit 376 in the second mode may be transmitted to the display 360.

According to various embodiments, a firmware of the motion detection sensor circuit 376 may be changed from a first version to a second version having limited functionality, according to the change from the first mode to the second mode.

According to various embodiments, the processor 320 may transmit the data (or information associated with the watch face image) to the motion detection sensor circuit 376 according to the change from the first mode to the second mode.

According to various embodiments, the processor 320 may transmit the data (or the information associated with the watch face image) to the motion detection sensor circuit 376 and then may be turned off, according to the change from the first mode to the second mode.

According to various embodiments, in the second mode, the motion detection sensor circuit 376 may detect a second motion associated with the electronic device 301, and may deactivate the display 360 in response to the detection of the second motion.

According to various embodiments, the first motion may be result of the operation of raising a user's wrist or raising the electronic device 301, and the second motion may be result of the operation of lowering the user's wrist or lowering the electronic device 301.

According to various embodiments, the processor 320 may determine a battery level, and may turn off the electronic device 301 when the battery level is equal to or smaller than a preset threshold value.

According to various embodiments, the display 360 and the motion detection sensor circuit 376 may be integrated within a display hub.

According to various embodiments, the display hub may further include a hub memory.

According to various embodiments, the motion detection sensor circuit 376 may provide at least one of time information, sensor information, and illuminance information to the display 360 in response to the detection of the first motion.

According to various embodiments, the data may include at least one of the image data, the time-related data, and the biometric information-related data.

According to various embodiments, the processor 320 may detect an input of the key 351, and may change the firmware of the motion detection sensor circuit 376 from the second version to the first version in response to the input of the key.

According to various embodiments, the processor 320 may transmit the data (or the information associated with the watch face image) to the hub memory according to the change from the first mode to the second mode.

According to various embodiments, the processor 320 may transmit the data (or the information associated with the watch face image) to the hub memory and then may be turned off, according to the change from the first mode to the second mode.

According to various embodiments, the display 360 may acquire the data (or the information associated with the watch face image) from the hub memory according to the change from the first mode to the second mode.

Figure 4:
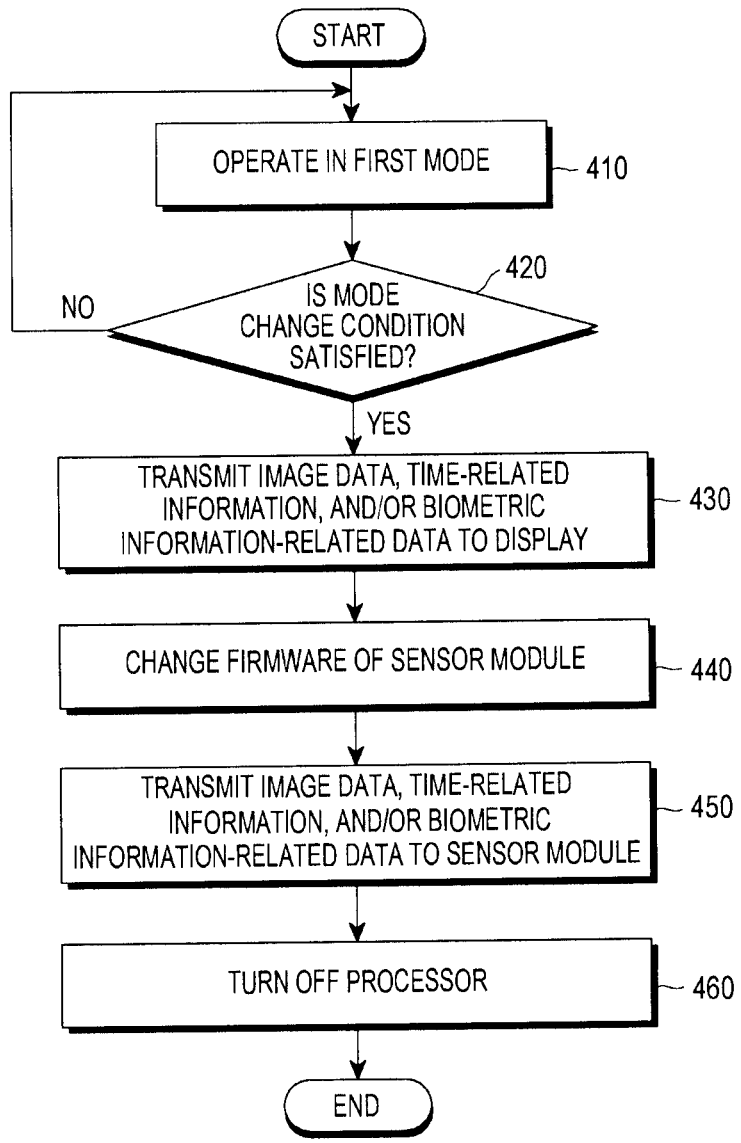
FIG. 4 is a flowchart illustrating a mode change method of an electronic device according to an embodiment.

FIG. 4 is a flowchart illustrating a mode change method of an electronic device according to an embodiment. The mode change method may include operations 410 to 460. Each step/operation of the mode change method may be performed by at least one of an electronic device (e.g., the electronic device 101 or 301), at least one processor (e.g., the processor 120 or 320) of the electronic device, and a control unit (e.g., a combination of the processor 120 or 320 and a power management module (e.g., the power management module 188 or 388)) of the electronic device. According to one embodiment, at least one of the operations 410 to 460 may be omitted, some operations thereof may be reordered, or other operations may be added.

In operation 410, the electronic device (e.g., processor) may operate in the first mode. As described above, the processor may be configured in several states, including a state of being turned on in the first mode (or normal mode) and a state of being turned off in the second mode (or watch only mode). Also as described above, in the first mode, the processor may transmit, to a display, image data (e.g., home screen, application screen, watch face image and/or biometric information-related image), time-related data (e.g., watch face image, current time information, and/or mode/image identification information associated with time display), and/or biometric information-related data (e.g., type of exercise, exercise time, remaining time, travel distance, consumed calories, user's heart rate, stress level due to exercise, and/or exercise progress) periodically or according to the occurrence of an event (e.g., wake up of the processor, activation of a display (e.g., the display device 160 or the display 360), message/call/data reception, user input, application operation, reception of sensor information, expiration of a timer, etc.). According to one embodiment, the processor may transmit the image data, the time-related data, and/or the biometric information-related data to the display based on information associated with motion (or in response to the reception of information associated with the motion) received from a sensor module (e.g., the sensor module 176 or 376).

In operation 420, the electronic device (e.g., processor) may determine whether a mode change condition is satisfied. The electronic device may perform operation 430 when the mode change condition is satisfied, and may repeat operations 410 and 420 when the mode change condition is not satisfied.

In operation 430, the electronic device (e.g., processor) may transmit the image data, the time-related data, and/or the biometric information-related information to the display. According to one embodiment, when the mode change condition is satisfied, the processor may transmit, to the display, the image data (e.g., the watch face image and/or the biometric information-related image), the time-related data (e.g., the watch face image, the current time information, and/or the mode/image identification information associated with time display), and/or the biometric information-related data. The display may display the watch face image and/or the biometric information-related data based on the image data, the time-related data, and/or the biometric information-related data received from the processor. For example, the display may display the watch face image received from the processor so that a user can visually perceive the mode change.

According to one embodiment, the display may display content indicating a mode change from the first mode to the second mode based on the image data or the time-related data received from the processor.

According to one embodiment, the display may display guidance information (e.g., text such as "now switching to watch only mode" or "watch only mode" and/or an image such as a progress bar or an icon) indicating that the mode change from the first mode to the second mode is in progress, or may display guidance information and/or the watch face image.

According to one embodiment, when the image data, the time-related data, and/or the biometric information-related data is stored in the internal memory of the display, operation 430 may be omitted.

In operation 440, the electronic device (e.g., processor and/or sensor module) may change the firmware of the sensor module from the first version (e.g., full version) to the second version (e.g., lite version) having limited functionality. According to one embodiment, the processor may store the second version of firmware in the internal memory of the sensor module. Depending on a command from the processor or a default setting of the sensor module, the sensor module may load the second version of firmware via a booting process.

In operation 450, the electronic device (e.g., processor) may transmit the image data, the time-related data, and/or the biometric information-related data to the sensor module. According to one embodiment, the sensor module may store the image data, the time-related data, and/or the biometric information-related data from the processor in the internal memory of the sensor module. The sensor module may then transmit, to the display, the data stored in the internal memory of the sensor module at the time of the occurrence of an event (e.g., wrist lifting) after a time point when the mode change is completed.

In operation 460, the electronic device may turn off the processor (e.g., power management module). According to one embodiment, the power management module (e.g., the power management module 188 or 388) may cut off the power supply to the processor through a switch (e.g., the switch 381).

According to one embodiment, the display may display guidance information (e.g., text such as "watch only mode" or the like, and/or an image such as an icon or the like) indicating the completion of the mode change from the first mode to the second mode, or may display the guidance information and/or the watch face image.

According to various embodiments, an operation method of the electronic device may include an operation of turning off the processor (e.g., the processor 320) of the electronic device, an operation of detecting the biometric information-related information using the sensor circuit (e.g., the sensor module 376) of the electronic device, and an operation of displaying at least partial data (e.g., the image data, the time-related data, and/or the biometric information-related data) on the display (e.g., the display 360) of the electronic device, according to the change from the first mode to the second mode.

According to various embodiments, information associated with the motion detected by the sensor circuit 376 in the first mode may be transmitted to the processor 320, and information associated with the motion detected by the sensor circuit 376 in the second mode may be transmitted to the display 360.

According to various embodiments, the method may further include an operation of controlling the processor 320 so as to transmit the time-related data or the biometric information-related data to the sensor circuit 376, according to the change from the first mode to the second mode.

According to various embodiments, the method may further include an operation of detecting the motion associated with the electronic device using the sensor circuit 376 in the second mode and an operation of deactivating the display 360 in response to the detection of the motion.

According to various embodiments, the method may further include an operation of changing a first firmware of the sensor circuit 376 to a second firmware of limited functionality according to the change from the first mode to the second mode.

According to various embodiments, in the method, the biometric information-related data may include information associated with a number of steps taken by the user.

According to various embodiments, the data may include at least one of the image data, the time-related data, and the biometric information-related data.

According to various embodiments, the method may further include an operation of detecting an input of the key (e.g., the key 351), and an operation of changing the second firmware of the sensor circuit 376 to the first firmware in response to the input of the key 351.

Figure 5:
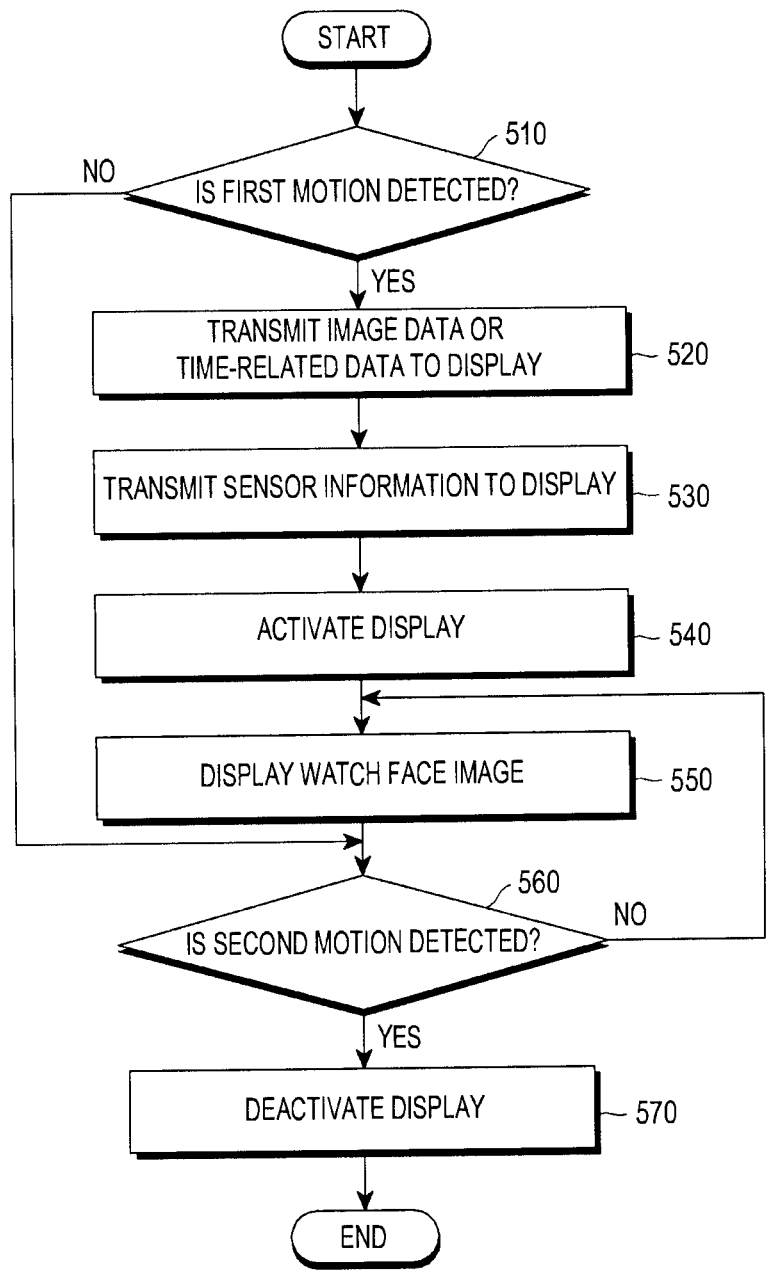
FIG. 5 is a flowchart illustrating an operation method of an electronic device according to an embodiment.

FIG. 5 is a flowchart illustrating an operation method of an electronic device according to an embodiment. The operation method may include operations 510 to 570. Each step/operation of the operation method may be performed by at least one of an electronic device (e.g., the electronic device 101 or 301), a sensor module (e.g., the sensor module 176 or 376), and a control unit (e.g., a combination of the sensor module and a display (e.g., the display device 160 or the display 360)) of the electronic device. According to one embodiment, at least one of the operations 510 to 570 may be omitted, some operations thereof may be reordered, or other operations may be added.

In operation 510, the electronic device (e.g., sensor module) may determine whether a first motion is detected. The electronic device may perform operation 520 when the first motion is detected. But when the first motion is not detected, the electronic device may skip to perform operation 560 or repeatedly perform operation 510 of determining whether the first motion is detected. According to one embodiment, the sensor module may detect the first motion of the electronic device through a motion sensor (e.g., an IMU, a gyro sensor, an acceleration sensor, and/or a gyro compass). According to one embodiment, the first motion may be result of the operation of raising the user's wrist/arm or raising the electronic device.

In operation 520, the electronic device (e.g., sensor module) may transmit, to a display, image data (e.g., watch face image and/or biometric information-related image), time-related data (e.g., watch face image, current time information, and/or mode/image identification information associated with time display), and biometric information-related data. According to one embodiment, the sensor module may store the image data, the time-related data, and/or the biometric information-related data in an internal memory of the display module.

In operation 530, the electronic device (e.g., sensor module) may transmit sensor information (e.g., biometric information or illuminance information) to the display. According to one embodiment, the sensor module may store the sensor information in the internal memory of the display.

According to one embodiment, the sensor module may detect biometric information indicating the psychological state or physical condition of the user using a health sensor, a biosensor, an HRM, etc.

According to one embodiment, the sensor module may detect ambient illuminance using an illuminance sensor.

According to one embodiment, operation 530 may be omitted, or may be integrated into operation 520.

In operation 540, the electronic device (e.g., sensor module) may activate the display. According to one embodiment, the sensor module may transmit a signal/command/information (e.g., a wake up signal or a display driver IC (DDI) ON command) for activating the display to the display.

In operation 550, the electronic device (e.g., display) may display a watch face image. According to one embodiment, the display may display the watch face image based on the image data, the time-related data, and/or the biometric information-related data which are received from the sensor module. According to one embodiment, the display may display the watch face image and/or the biometric information-related data in response to the signal/command/information received from the sensor module.

According to one embodiment, operation 540 may be integrated into operation 550.

In operation 560, the electronic device (e.g., sensor module) may determine whether a second motion is detected. The electronic device may perform operation 570 when the second motion is detected, and may maintain operation 550, i.e., maintain the display, when the second motion is not detected.

According to one embodiment, the electronic device may perform operation 570 of deactivating the display when a predetermined time period has elapsed from when the first motion was detected (or when a timer has expired).

According to one embodiment, the sensor module may detect the second motion of the electronic device through the motion sensor. According to one embodiment, the second motion may be the result of the operation of lowering the user's wrist/arm or lowering the electronic device.

In operation 570, the electronic device (e.g., sensor module) may deactivate the display. According to one embodiment, the sensor module may transmit a signal/command/information (e.g., a sleep signal or a DDI OFF command) for deactivating the display, to the display. According to one embodiment, the display may be deactivated in response to the signal/command/information received from the sensor module.

Figure 6:
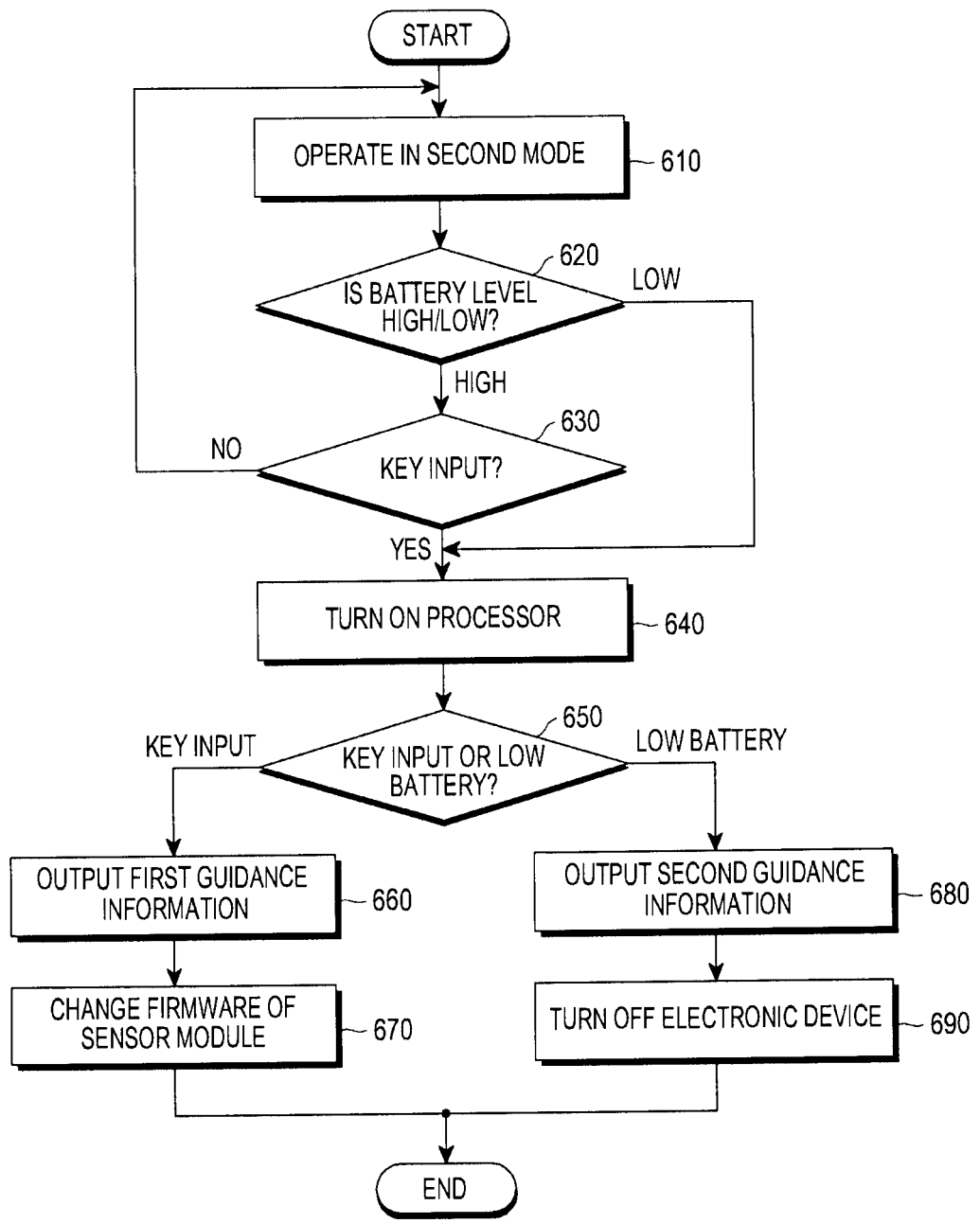
FIG. 6 is a flowchart illustrating a mode change method of an electronic device according to an embodiment.

FIG. 6 is a flowchart illustrating a mode change method of an electronic device according to an embodiment. The mode change method may include operations 610 to 690. Each step/operation of the mode change method may be performed by at least one of an electronic device (e.g., the electronic device 101 or 301), a sensor module (e.g., the sensor module 176 or 376), a power management module (e.g., the power management module 188 or 388), at least one processor (e.g., the processor 120 or 320) of the electronic device, a display (e.g., the display device 160 or the display 360), and a control unit (e.g., a combination of two or more of the sensor module, the power management module, the display, and the processor) of the electronic device.

In operation 610, the electronic device (e.g., sensor module and/or display) may be operated in the second mode. For example, the processor may be in a state of being turned off in the second mode. According to one embodiment, in the second mode, the sensor module may transmit, to a display, image data (e.g., watch face image and/or biometric information-related image) or time-related data (e.g., watch face image, current time information, and/or mode/image identification information associated with time display) periodically or according to the occurrence of an event (e.g., activation of the display 360, user input, application operation, detection of motion/sensor information, and/or expiration of a timer). The display may display the watch face image and/or the biometric information-related data based on at least a portion of the received image data or time-related data. According to one embodiment, the sensor module may detect a first motion or a second motion using a motion sensor (e.g., an IMU, a gyro sensor, an acceleration sensor, a gyro compass, etc.), and may transmit a signal for turning on/off the display to the display based on at least a portion of the detected information regarding the first motion or the second motion.

In operation 620, the electronic device (e.g., sensor module or power management module) may determine whether a battery level (i.e. the amount remaining in the battery) is in a high state or a low state. The electronic device may perform operation 630 when the battery level is in the high state, and may perform operation 640 when the battery level is in the low state. According to one embodiment, the sensor module or the power management module may compare the battery level and a threshold value, may determine that the battery level is in the low state when the battery level is equal to or smaller than the threshold value, and may determine that the battery level is in the high state when the battery level exceeds the threshold value.

In operation 630, the electronic device (e.g., sensor module or power management module) may determine whether pressing/input/selection of a predetermined key (e.g., the key 351 or a power key) is detected. The electronic device may perform operation 640 when an input of the key is detected, and may revert to operation 610 when the input of the key is not detected. Thus, according to one embodiment, the sensor module or the power management module may monitor the input of the key.

According to one embodiment, the power management module may be turned off in the second mode. In the second mode, some functions (e.g., measurement of at least one of a remaining amount of the battery 389 and a voltage, a current, or a temperature during charging) of the power management module may be performed by the sensor module. According to one embodiment, when the input of the key is detected, the power management module may be turned on to turn on the processor.

In operation 640, the electronic device (e.g., power management module) may turn on the processor. According to one embodiment, the power management module may supply power to the processor. According to one embodiment, the power management module may change a switch (e.g., the switch 381) from an OFF state to an ON state in order to supply power to the processor.

In operation 650, the electronic device (e.g., processor) may determine whether the reason for the processor to be turned on is due to the input of the key (or detection of the input of the key) or low battery. The electronic device may perform operation 660 when the processor is turned on due to the input of the key, or may perform operation 680 when the processor is turned on due to low battery.

In operation 660, when the processor is turned on due to the input of the key, the electronic device (e.g., processor and/or display) may output first guidance information. For example, the first guidance information may be text such as "exit watch only mode" and/or an image such as a progress bar or an icon indicating the electronic device will transition out of the second mode.

In operation 670, the electronic device (processor and/or sensor module) may change the firmware of the sensor module from a second version (e.g., lite version) having limited functionality to a first version (e.g., full version). According to one embodiment, the processor may store the first version of firmware in the internal memory of the sensor module. The sensor module may load the first version of firmware through a booting process depending on the command from the processor or the default setting of the sensor module.

According to one embodiment, for a change from the second mode to the first mode, the processor may perform a normal booting process using the first version of the firmware.

In operation 680, when the processor is turned on due to low battery, the electronic device (e.g., processor and/or display) may output second guidance information. For example, the second guidance information may be text such as "low battery, power off" and/or an image such as a progress bar or an icon indicating the turning off (or powering off) of the electronic device.

In operation 690, the electronic device may be turned off.

According to one embodiment, in operation 620, when the battery level is in the low state, the electronic device (e.g., sensor module and/or display) may perform operation 680 of outputting the second guidance information and operation 690 of turning off the electronic device without performing operations 640 and 650.

Figure 7:
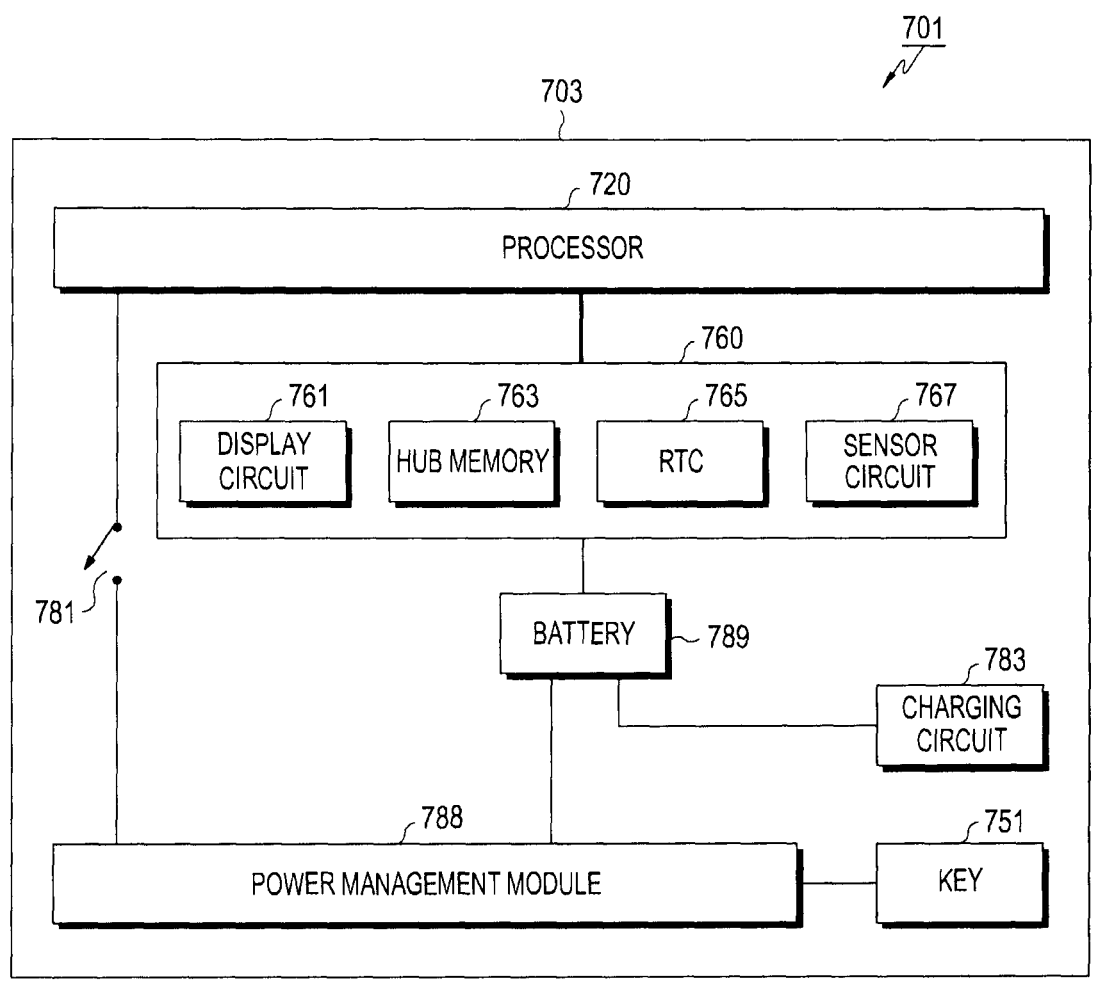
FIG. 7 is a block diagram illustrating an electronic device according to an embodiment.

FIG. 7 is a block diagram illustrating an electronic device according to an embodiment.

An electronic device 701 (e.g., the electronic device 101 or 301) may include a processor 720 (e.g., the processor 120 or 320), a housing 730 (e.g., the housing 303), a key 751 (e.g., the key 351), a display hub 760, a switch 781 (e.g., the switch 381), a charging circuit 783 (e.g., the charging circuit 210 or 383 or a charging IC), a power management module 788 (e.g., the power management module 188 or 388) or a power management circuit), and a battery 789 (e.g., the battery 189 or 389). The display hub 760 may include a display circuit (e.g., the display device 160, the display 360, or a display IC), a hub memory 763, a real time clock (RTC) 765 (or clock), and a sensor circuit 776 (e.g., the sensor module 176 or 376 or a sensor IC).

According to one embodiment, in the electronic device 701, at least one of these components may be omitted or another component (e.g., the communication module 190 or the memory 130) may be added.

Hereinafter, the description of the components of the electronic device 301 shown in FIG. 3 may be applied to the corresponding components (or components with same/similar names) of the electronic device 701, and thus redundant description thereof will be omitted.

The processor 720 may be disposed in the housing 703, and may be functionally connected to the display hub 760. The processor 720 may be electrically connected to the power management module 788. The processor 720 may be in several states, including a state of being turned on in a first mode (or normal mode) and in a state of being turned off in a second mode (or watch only mode). According to one embodiment, the processor 720 may be electrically connected to the power management module 788 through the switch 781 (e.g., hardware switch or software switch). When the processor 720 is in the first mode, the switch 781 may be in an ON state (or closed state). When the processor 720 is in the second mode, the switch 781 may be in an OFF state (or opened state). According to one embodiment, the switch 781 may be located in the power management module 788.

In the first mode, the processor 720 may transmit, to the display hub 760 or the display circuit 761, image data (e.g., home screen, application screen, watch face image and/or biometric information-related image), time-related data (e.g., watch face image, current time information, and/or mode/image identification information associated with time display), and/or biometric information-related data periodically or according to the occurrence of an event (e.g., wake up of the processor 720, activation/turn on of the display circuit 761, message/call/data reception, user input, application operation, reception of sensor information, and/or expiration of a timer). The display hub 760 may store the data in the hub memory 763.

According to one embodiment, in the first mode, the processor 720 may receive information associated with a first motion from the display hub 760 or the sensor circuit 767. The processor 720 may transmit the image data, the time-related data, and/or the biometric information-related data to the display hub 760 or the display circuit 761 based on the information associated with the first motion (or in response to the reception of the information associated with the first motion). According to one embodiment, the processor 720 may activate the display hub 760 or the display circuit 761 based on the information associated with the first motion (or in response to the reception of the information associated with the first motion).

In the first mode, the processor 720 may receive information associated with a second motion from the display hub 760 or the sensor circuit 767. The processor 720 may deactivate the display circuit 761 based on the information associated with the second motion (or in response to the reception of the information associated with the second motion). The processor 720 may automatically enter a sleep mode within/after a predetermined time period from a time point when the display circuit 761 is deactivated or immediately after the display circuit 761 is deactivated.

According to one embodiment, for the change from the first mode to the second mode, or when an event associated with the mode change occurs (e.g., when satisfaction of the mode change condition occurs), the processor 720 may transmit the image data, the time-related data, and/or the biometric information-related data to the display hub 760 or the display circuit 761.

The processor 720 may be automatically turned off (or shut down) within a predetermined time period after transmitting the image data, the time-related data, and/or the biometric information-related data to the display hub 760 or the display circuit 761, or immediately after transmitting the same.

The display hub 760 may be disposed in the housing, and may be at least partially exposed through a portion of the housing. The display hub 760 may be electrically connected to the rechargeable battery 789.

In the first mode, the display circuit 761 may receive the image data, the time-related data, and/or the biometric information-related data from the processor 720 or the hub memory 763. The display circuit 761 may display a watch face image and/or the biometric information-related data based on at least a portion of the image data, the time-related data, and/or the biometric information-related data. The display circuit 761 may acquire a portion of the time-related data (e.g., current time information) from the RTC 765.

In the second mode, the display circuit 761 may receive the image data, the time-related data, and/or the biometric information-related data from the sensor circuit 767 or the hub memory 763. The display circuit 761 may display the watch face image and/or the biometric information-related data based on at least a portion of the received image data, time-related data, and/or biometric information-related data. For example, the display circuit 761 may display the received watch face image so that a user can visually perceive the mode change.

According to one embodiment, the display circuit 761 may display the mode change from the first mode to the second mode to the user based on the received image data or time-related data.

According to one embodiment, in the first mode, the display circuit 761 may display guidance information (e.g., text such as "now switching to watch only mode" and/or an image such as a progress bar or an icon) indicating that the mode change from the first mode to the second mode is in progress, or may display the guidance information and/or the watch face image.

According to one embodiment, the display circuit 761 may display guidance information (e.g., text such as "watch only mode" and/or an image indicating the completion of the mode change from the first mode to the second mode), or may display the guidance information and/or the watch face image.

The charging circuit 783 may charge the battery 789 using power supplied through a VBUS from an external power source.

The power management module 788 may adjust the power of the battery 789 to a voltage or current level suitable for each of the components included in the electronic device 701.

Each of the display hub 760, the display circuit 761, or the sensor circuit 767 may include a power regulator (e.g., the power regulator 220) for adjusting the power of the battery 789 to a voltage or current level suitable for the display hub 760, the display circuit 761, or the sensor circuit 767.

Figure 8:
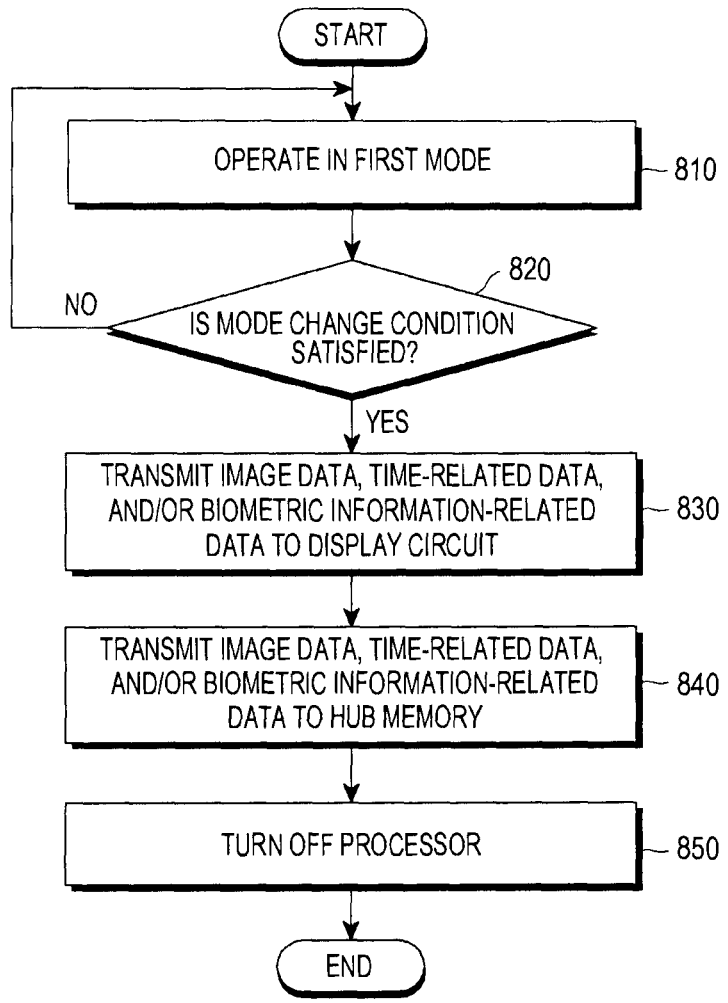
FIG. 8 is a flowchart illustrating a mode change method of an electronic device according to an embodiment.

FIG. 8 is a flowchart illustrating a mode change method of an electronic device according to an embodiment. The mode change method may include operations 810 to 850. Each operation/step of the mode change method may be performed by at least one of an electronic device (e.g., the electronic device 101, 301, or 701), at least one processor (e.g., the processor 120, 320, or 720) or the electronic device, and a control unit {e.g., a combination of a processor and a power management module (e.g., the power management module 188, 388, or 788)} of the electronic device. According to one embodiment, at least one of the operations 810 to 850 may be omitted, some operations thereof may be reordered, or other operations may be added.

Hereinafter, operations 410 to 430, 450, and 460 of the mode change method shown in FIG. 4 may respectively correspond to operations 810 to 850 of the mode change method, and thus redundant description thereof will be omitted.

In operation 810, the electronic device (e.g., processor) may operate in the first mode. As described above, the processor may be in several states, including a state of being turned on in the first mode (or normal mode) and a state of being turned off in a second mode (or watch only mode). In the first mode, the processor may transmit, to a display hub (e.g., the display hub 760) or a display circuit, image data (e.g., home screen, application screen, watch face image and/or biometric information-related image), time-related data (e.g., watch face image, current time information, and/or mode/image identification information associated with time display), and/or biometric information-related data periodically or according to the occurrence of an event (e.g., wake up of the processor, activation/turn on of a display circuit (e.g., the display device 160, the display 360, or the display circuit 761), message/call/data reception, user input, application operation, reception of sensor information, and expiration of a timer). According to one embodiment, the processor may transmit the image data, the time-related data, and/or the biometric information-related data to the display hub or the display circuit based on information associated with a motion received from the display hub or the sensor circuit (e.g., the sensor module 176 or 376 or the sensor circuit 767).

In operation 820, the electronic device (e.g., processor) may determine whether a mode change condition is satisfied. The electronic device may perform operation 830 when the mode change condition is satisfied, and may repeat operations 810 and 820 when the mode change condition is not satisfied.

In operation 830, the electronic device (e.g., processor) may transmit image data (e.g., watch face image and/or biometric information-related image), time-related data (e.g., watch face image, current time information, and/or mode/image identification information associated with time display), and/or the biometric information-related data to the display circuit. According to one embodiment, when the mode change condition is satisfied, the processor may transmit the image data, the time-related data, and/or the biometric information-related data to the display circuit. The display circuit may display the watch face image and/or the biometric information-related data based on at least a portion of the image data, the time-related data, and/or the biometric information-related data received from the processor. For example, the display circuit may display the watch face image received from the processor so that a user can visually perceive the mode change.

According to one embodiment, the display circuit may display the mode change from the first mode to the second mode to the user based on the received image data or time-related data.

According to one embodiment, the display circuit may display guidance information (e.g., text such as "now switching to watch only mode" or "watch only mode" and/or an image such as a progress bar or an icon indicating that the mode change from the first mode to the second mode is in progress), or may display the guidance information and/or the watch face image. In operation 840, the electronic device (e.g., processor) may transmit the image data, the time-related data, and/or the biometric information-related data to the hub memory (e.g., the hub memory 763). According to one embodiment, the processor may store the image data, the time-related data, and/or the biometric information-related data in the hub memory.

According to one embodiment, operation 830 may be omitted or may be integrated into operation 840.

In operation 850, the electronic device (e.g., power management module) may turn off the processor. According to one embodiment, the power management module may cut off power provided to the processor. For example, the power management module may cut off the power supply to the processor through a switch (e.g., the switch 381 or 781).

According to one embodiment, the display circuit may display guidance information (e.g., text such as "watch only mode" and/or an icon such as an icon indicating the completion of the mode change from the first mode to the second mode), or may display the guidance information and/or the watch face image.

Figure 9:
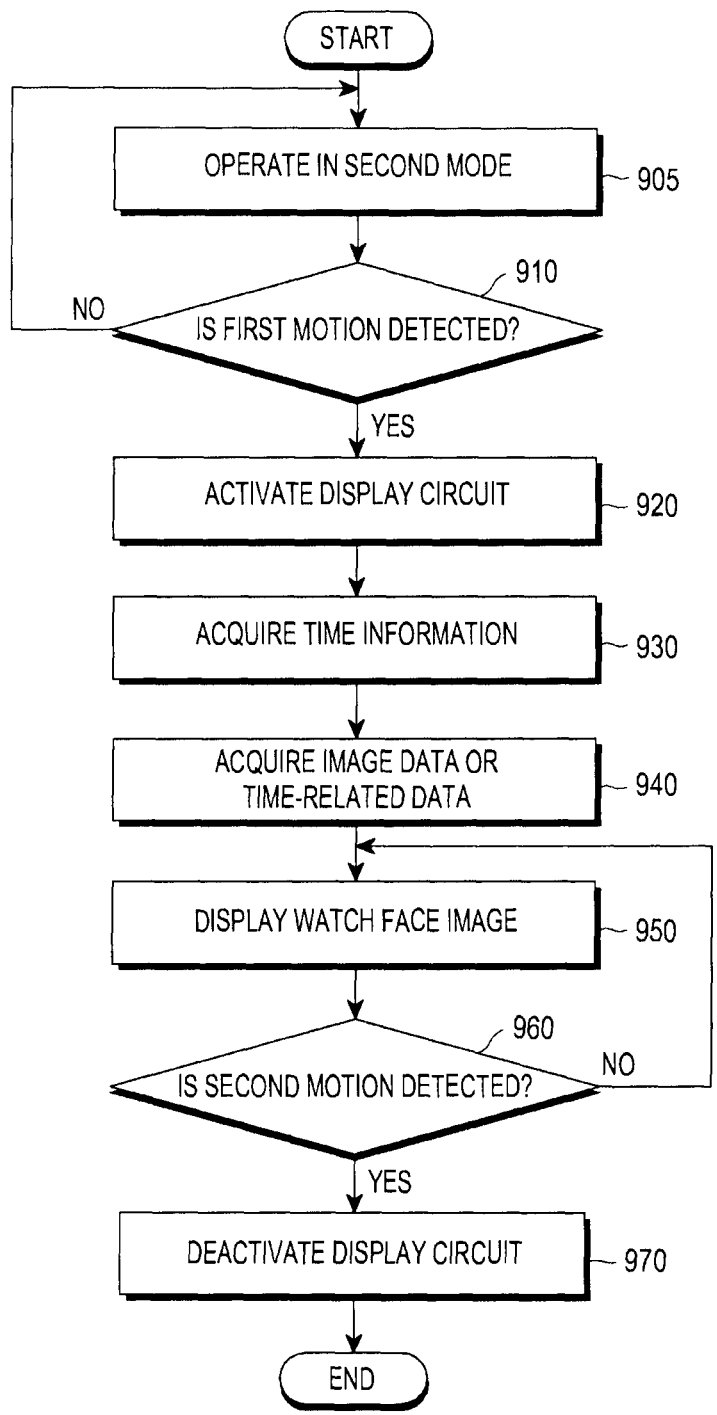
FIG. 9 is a flowchart illustrating an operation method of an electronic device according to an embodiment.

FIG. 9 is a flowchart illustrating an operation method of an electronic device according to an embodiment. The operation method may include operations 905 to 970. Each step of the operation method may be performed by at least one of an electronic device (e.g., the electronic device 101 or 301), a display hub (e.g., the display hub 760), and a control unit of the electronic device. According to one embodiment, at least one of operations 905 to 970 may be omitted, some operations thereof may be reordered, or other operations may be added.

Hereinafter, the operations 510 and 540 to 570 of the operation method shown in FIG. 5 may respectively correspond to operations 910, 920, and 950 to 970 of the mode change method, and thus redundant description thereof will be omitted.

In operation 905, an electronic device (e.g., sensor circuit and/or display circuit) may operate in the second mode. In the second mode, the processor of the electronic device may be turned off. According to one embodiment, in the second mode, a display hub or a sensor circuit (e.g., the sensor module 176 or 376, or the sensor circuit 767) may transmit, to the display circuit, image data (e.g., watch face image and/or biometric information-related image), time-related data (e.g., watch face image, current time information, and/or mode/image identification information associated with time display), and biometric information-related data periodically or according to the occurrence of an event (e.g., activation of the display circuit (e.g., the display device 160, the display 360, or the display circuit 761), user input, application operation, detection of motion/sensor information, and expiration of a timer). According to one embodiment, the sensor module may store the image data, the time-related data, and/or the biometric information-related data in the internal memory of the display module. The display circuit may display a watch face image.

In operation 910, the electronic device (e.g., sensor circuit) may determine whether the first motion is detected. The electronic device may perform operation 920 when the first motion is detected, and may repeat operation 905 when the first motion is not detected.

According to one embodiment, the electronic device may perform an operation of deactivating the display circuit when a predetermined time period from when a first motion was detected (or when a timer has expired).

According to one embodiment, the display hub or the sensor circuit (e.g., the sensor module 176 or 376 or the sensor circuit 767) may detect the first motion of the electronic device through a motion sensor (e.g., a gyro sensor, an acceleration sensor, a gyro compass, etc.). According to one embodiment, the first motion may be result of the operation of raising the user's wrist/arm or raising the electronic device.

In operation 920, the electronic device (e.g., sensor circuit) may activate the display circuit (e.g., the display device 160, the display 360, or the display circuit 761). According to one embodiment, the display hub or the sensor circuit may transit a signal/command/information (e.g., a wake up signal or a DDI ON command) for activating the display circuit to the display circuit.

In operation 930, the electronic device (e.g., display circuit) may acquire time information. According to one embodiment, the display hub or the display circuit may acquire time information (e.g., current time information) from an RTC (e.g., the RTC 765).

In operation 940, the electronic device (e.g., display circuit) may acquire image data (e.g., watch face image and/or biometric information-related image), time-related data (e.g., watch face image, current time information, and/or mode/image identification information associated with time display), and/or biometric information-related data. According to one embodiment, the display hub or the display circuit may acquire the image data, time-related data, and/or biometric information-related data which are stored in a hub memory (e.g., the hub memory 763).

According to one embodiment, operation 930 may be integrated into operation 940, or operations 930 and 940 may be integrated into operation 920 or 950.

In operation 950, the electronic device (e.g., display circuit) may display the watch face image. According to one embodiment, the display circuit may display the watch face image and/or the biometric information-related data based on at least a portion of the image data, the time-related data, and/or the biometric information-related data which are acquired from the hub memory. According to one embodiment, the display circuit may display the watch face image and/or the biometric information-related data in response to a signal/command/information received from the display hub or the sensor circuit.

In operation 960, the electronic device (e.g., sensor circuit) may determine whether a second motion is detected. The electronic device may perform operation 970 when the second motion is detected, and may maintain operation 950 when the second motion is not detected. The sensor circuit may detect the second motion of the electronic device through a motion sensor. According to one embodiment, the second motion may be the result of the operation of lowering the user's wrist/arm or lowering the electronic device.

According to one embodiment, the electronic device (e.g., sensor circuit) may perform operation 970 of deactivating the display circuit when a predetermined time period has elapsed since the first motion was detected (or when a timer has expired).

In operation 970, the electronic device (e.g., sensor circuit) may deactivate the display circuit. According to one embodiment, the display hub or the sensor circuit may transmit a signal/command/information (e.g., a sleep signal or a DDI OFF command) for deactivating the display circuit, to the display circuit. According to one embodiment, the display circuit may be deactivated in response to the signal/command/information received from the display hub or the sensor circuit.

Figure 10:
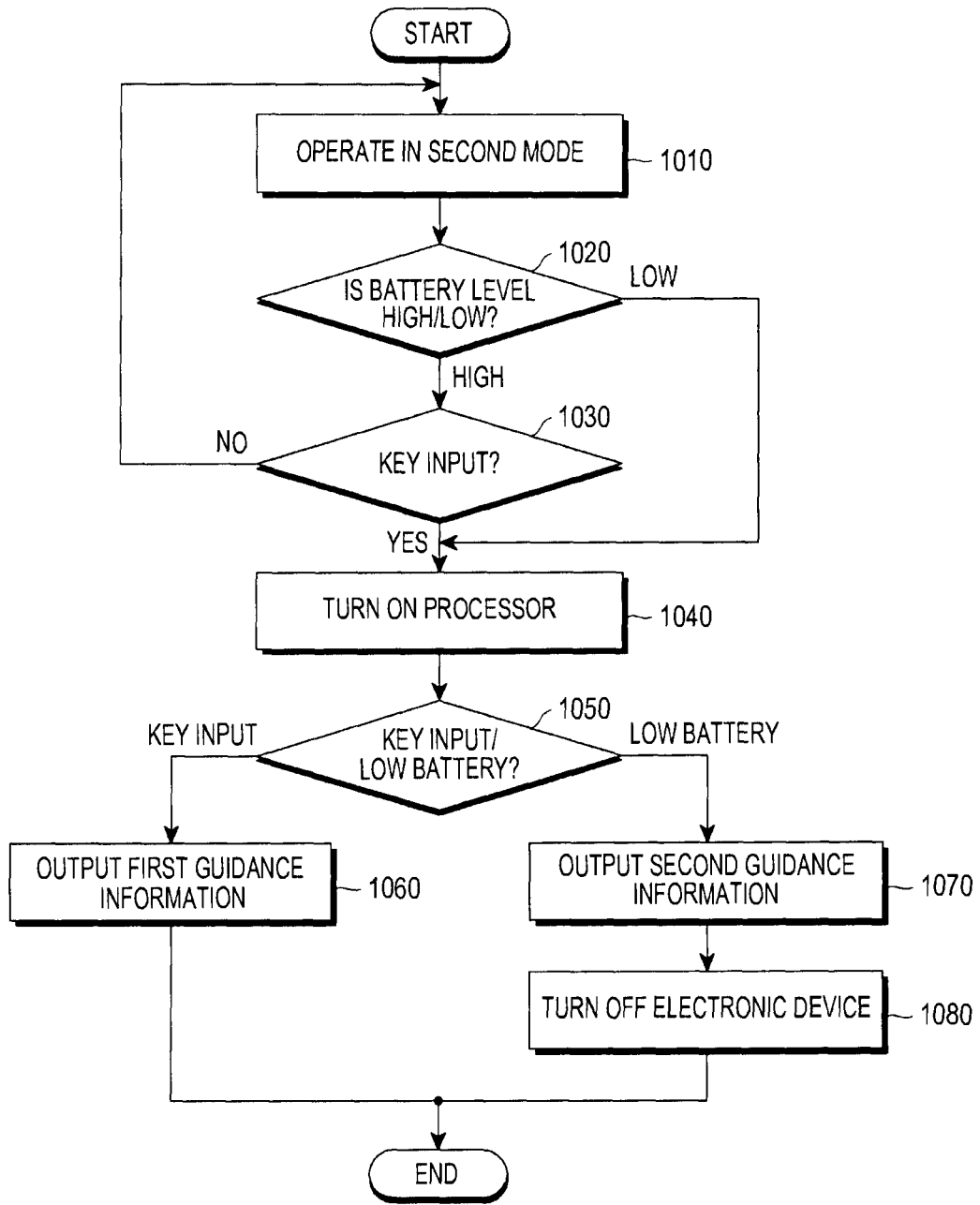
FIG. 10 is a flowchart illustrating a mode change method of an electronic device according to an embodiment.

FIG. 10 is a flowchart illustrating a mode change method of an electronic device according to an embodiment. The mode change method may include operations 1010 to 1080. Each operation/step of the mode change method may be performed by at least one of an electronic device (e.g., the electronic device 101 or 301), a display hub (e.g., the display hub 760), a power management module (e.g., the power management module 188 or 388), at least one processor (e.g., the processor 120 or 320), and a control unit (e.g., a combination of two or more of display hub, power management module, and processor) of the electronic device. According to one embodiment, at least one of operations 1010 to 1080 may be omitted, some operations thereof may be reordered, or other operation may be added.

Hereinafter, operations 610 to 660, 680, and 690 of the operation method shown in FIG. 6 may respectively correspond to operations 1010 to 1080 of the mode change method, and thus redundant description thereof will be omitted.

In operation 1010, an electronic device (e.g., sensor circuit and/or display circuit) may operate in the second mode. In the second mode, the processor of the electronic device may be turned off. According to one embodiment, in the second mode, a display hub or a sensor circuit (e.g., the sensor module 176 or 376 or the sensor circuit 767) may transmit, to a display circuit, image data (e.g., watch face image and/or biometric information-related image), time-related data (e.g., watch face image, current time information, and/or mode/image identification information associated with time display), and/or biometric information-related data periodically or according to the occurrence of an event (e.g., activation of a display circuit (e.g., the display device 160, the display 360, or the display circuit 761), user input, application operation, detection of motion/sensor information, and/or expiration of a timer). The display circuit may display a watch face image.

According to one embodiment, the electronic device may perform the operation of deactivating the display circuit and entering the second mode when a predetermined time period has elapsed from when the first motion described above was detected (or when a timer has expired).

In operation 1020, the electronic device (e.g., sensor circuit and/or power management module) may determine whether a battery level (or the amount remaining in the battery) is in a high state or a low state. The electronic device may perform operation 1030 when the battery level is in the high state, and may perform operation 1040 when the battery level is in the low state. According to one embodiment, the display hub, the sensor circuit, or the power management module may compare the battery level and a threshold value, may determine that the battery level is in the low state when the battery level is equal to or smaller than the threshold value, and may determine that the battery level is in the high state when the battery level (exceeds the threshold value.

In operation 1030, the electronic device (e.g., sensor circuit or power management module) may determine whether pressing/input of a predetermined key (e.g., the key 351 or 751 or a power key) is detected. The electronic device may perform operation 1040 when an input of the key is detected, and may revert to operation 1010 when the input of the key is not detected. Thus, according to one embodiment, the display hub, the sensor circuit, or the power management module may monitor the input of the key.

According to one embodiment, in the second mode, the power management module may be turned off. According to one embodiment, in the second mode, some functions (e.g., measurement of at least one of a remaining amount of the battery 789 and a voltage, a current, or a temperature during charging) of the power management module may be performed by the sensor circuit. According to one embodiment, when the input of the key is detected, the power management module may be turned on to turn on the processor.

In operation 1040, the electronic device (e.g., power management module) may turn on the processor. According to one embodiment, the power management module may supply power to the processor. According to one embodiment, the power management module may change a switch (e.g., the switch 381 or 781) from an OFF state to an ON state in order to supply power to the processor.

In operation 1050, the electronic device may determine whether the reason for the processor to be turned on is due to the input of the key (or detection of the input of the key) or low battery. The electronic device may perform operation 1060 when the processor is turned on due to the input of the key, or may perform operation 1070 when the processor is turned on due to the low battery.

In operation 1060, when the processor is turned on due to the input of the key, the electronic device (e.g., processor and/or display circuit) may output first guidance information. For example, the first guidance information may be text such as "exit watch only mode" and/or an image such as a progress bar or an icon indicating the electronic device will transition out of the second mode.

According to one embodiment, for a change from the second mode to the first mode, the processor may perform a normal booting process.

In operation 1070, the electronic device (e.g., processor and/or display circuit) may output second guidance information. For example, the second guidance information may be text such as "low battery, power off" and/or an image such as a progress bar or an icon indicating the turning off (or powering off) of the electronic device.

According to one embodiment, operations 1060 and 1070 may be omitted.

In operation 1080, the electronic device may be turned off.

According to one embodiment, when the battery level is in the low state in operation 1050, the electronic device (e.g., sensor module and/or display) may perform operation 1070 of outputting the second guidance information and operation 1080 of turning off the electronic device without performing operations 1040 and 1050.

Figure 11:
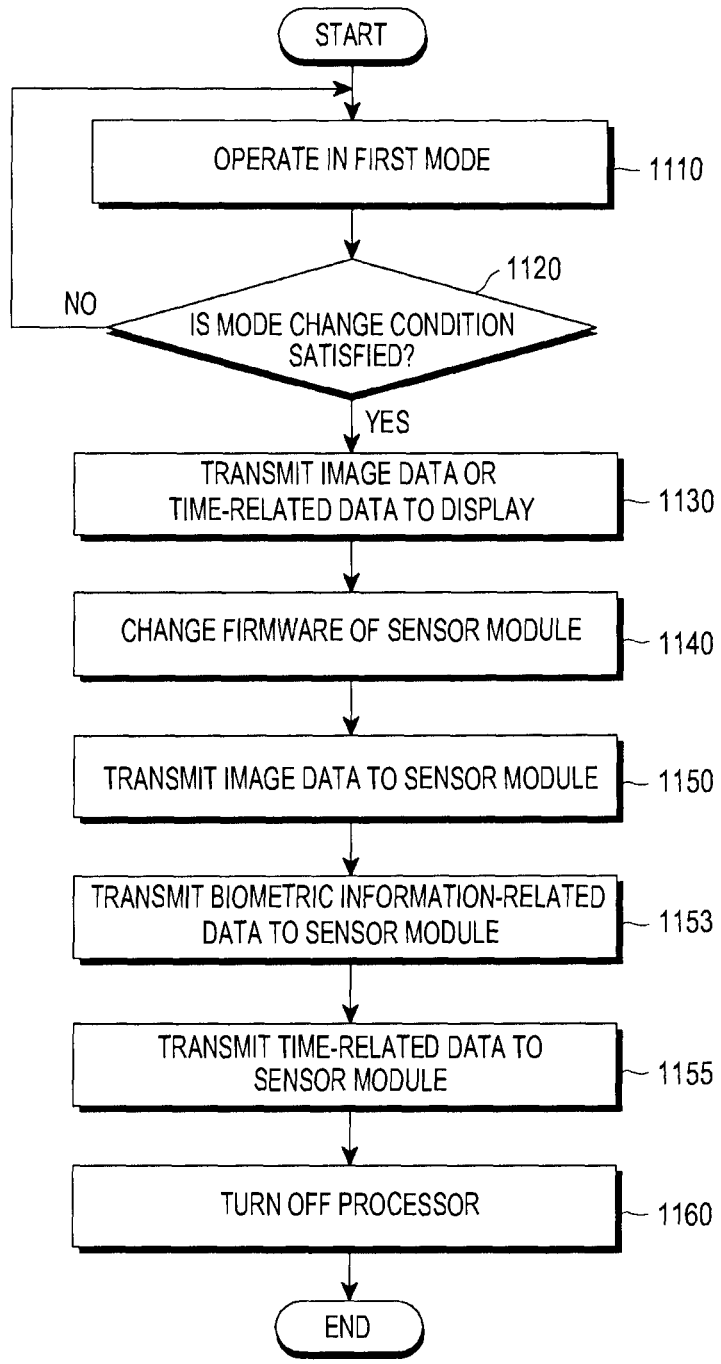
FIG. 11 is a flowchart illustrating a mode change method of an electronic device according to an embodiment.

FIG. 11 is a flowchart illustrating a mode change method of an electronic device according to an embodiment. The mode change method may include operations 1110 to 1160. Each step/operation of the mode change method may be performed by at least one of an electronic device (e.g., the electronic device 101, 301, or 701), at least one processor (e.g., the processor 120, 320, or 720) of the electronic device, and a control unit (e.g., a combination of the processor 120 or 320 or a power management module (e.g., the power management module 188, 388, or 788) of the electronic device. According to one embodiment, at least one of operations 1110 to 1160 may be omitted, some operations thereof may be reordered, or other operations may be added.

Hereinafter, the operations 410 to 440 and 460 of the mode change method shown in FIG. 4 may respectively correspond to the operations 1110 to 1140 and 1160 of the mode change method, and thus redundant description thereof will be omitted.

In operation 1110, an electronic device (e.g., processor) may operate in the first mode. As described above, the processor may be in several states, including a state of being turned on in the first mode (or normal mode) or a state of being turned off in a second mode (watch only mode). In the first mode, the processor may transmit, to a display, image data (e.g., home screen, application screen, watch face image and/or biometric information-related image), time-related data (e.g., watch face image, current time information, and/or mode/image identification information associated with time display), and/or biometric information-related data (e.g., type of exercise, exercise time, remaining time, travel distance, consumed calories, user's heart rate, stress level due to exercise, or exercise progress) periodically or according to the occurrence of an event (e.g., wake up of the processor, activation/turn on of the display (e.g., the display device 160, the display 360, or the display circuit 761), message/call/data reception, user input, application operation, reception of sensor information, and/or expiration of a timer).

In operation 1120, the electronic device (e.g., processor) may determine whether a mode change condition is satisfied. The electronic device may perform operation 1130 when the mode change condition is satisfied, and may repeat operations 1110 and 1120 when the mode change condition is not satisfied.

In operation 1130, the electronic device (e.g., processor) may transmit the image data, the time-related data, and/or the biometric information-related data to the display. The display may display a watch face image and/or the biometric information-related data based on the image data, time-related data, and/or biometric information-related data which are received from the processor.

According to one embodiment, when the image data or the time-related data is stored in the internal memory of the display, operation 1130 may be omitted.

In operation 1140, the electronic device (e.g., processor and/or sensor module) may change the firmware of the sensor module (e.g., the sensor module 176 or 376 or the sensor circuit 767) from a first version (e.g., full version) to a second version (e.g., lite version) having limited functionality.

In operation 1150, the electronic device (e.g., processor) may transmit the image data to the sensor module.

In operation 1153, the electronic device (e.g., processor) may transmit the biometric information-related data (e.g., type of exercise, exercise time, remaining time, travel distance, consumed calories, user's heart rate, stress level due to exercise, or exercise progress) to the sensor module. The sensor module may store the biometric information-related data in the internal memory thereof. According to one embodiment, the sensor module may accumulate newly detected biometric information-related data and store the newly detected biometric information-related data along with previously-stored biometric information-related data. The sensor module may transmit the accumulated biometric information-related data to the display, and the display may display the accumulated biometric information-related data. For example, the sensor module may receive data on a first number of steps taken by the user from the processor. In the second mode, the sensor module may accumulate a second number of steps that is newly detected with the first number of steps. The sensor module may transmit the accumulated number of steps to the display, and the display may display the accumulated number of steps.

In operation 1155, the electronic device (e.g., processor) may transmit the time-related data to the sensor module. The sensor module may correct/synchronize the time value of an internal RTC of the sensor module based on the received time-related data.

In operation 1160, the electronic device may turn off the processor (e.g., power management module). According to one embodiment, the power management module (e.g., the power management module 188 or 388) may cut off power provided to the processor. According to one embodiment, the power management module may cut off the power supply to the processor through a switch (e.g., the switch 381).

According to one embodiment, the display may display guidance information (e.g., text such as "watch only mode" and/or an image such as an icon indicating the completion of the mode change from the first mode to the second mode), or may display the guidance information and/or the watch face image.

Figure 12:
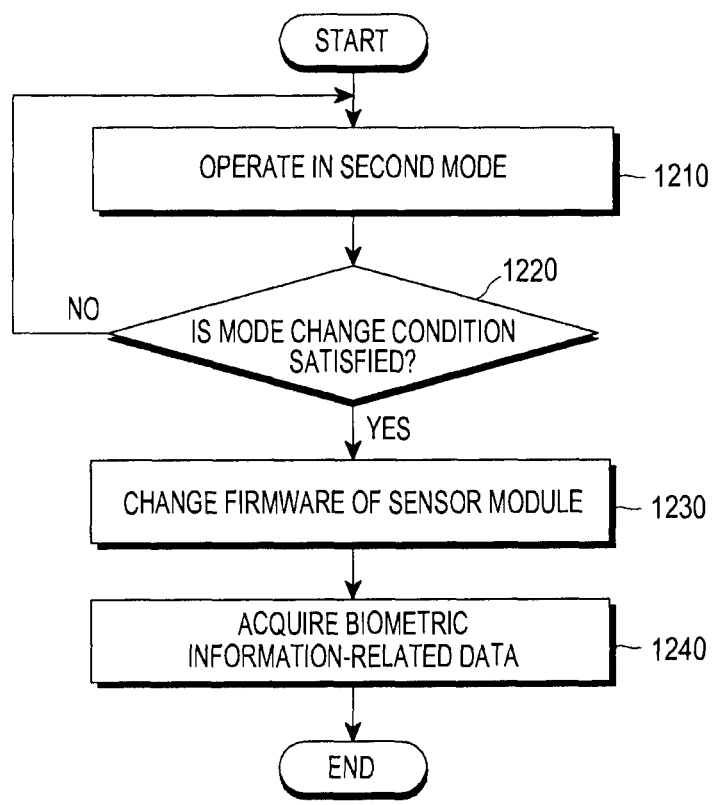
FIG. 12 is a flowchart illustrating a mode change method of an electronic device according to an embodiment.

FIG. 12 is a flowchart illustrating a mode change method of an electronic device according to an embodiment. The mode change method may include operations 1210 to 1240. Each operation/step of the mode change method may be performed by at least one of an electronic device (e.g., the electronic device 101, 301, or 701), a sensor module (e.g., the sensor module 176 or 376 or the sensor circuit 767), a power management module (e.g., the power management module 188 or 388), at least one processor (e.g., the processor 120 or 320), a display (e.g., the display device 160, the display 360, or the display circuit 761), and a control unit (e.g., a combination of two or more of sensor module, power management module, display, and processor) of the electronic device. According to one embodiment, at least one of operations 1210 to 1240 may be omitted, some operations thereof may be reordered, or other operations may be added.

In operation 1210, an electronic device (e.g., sensor module and/or display) may be operated in a second mode. For example, in the second mode, the processor of the electronic device may be turned off.

According to one embodiment, in the second mode, the sensor module may transmit, to a display, image data (e.g., watch face image and/or biometric information-related image) or time-related data (e.g., at watch face image, current time information, and/or mode/image identification information associated with time display) periodically or according to the occurrence of an event (e.g., activation of the display 360, user input, application operation, detection of motion/sensor information, and/or expiration of a timer). The display may display the watch face image and/or the biometric information-related data based on at least a portion of the received image data or time-related data.

In operation 1220, the electronic device (e.g., sensor module or power management module) may determine whether a mode change condition is satisfied. The electronic device may perform operation 1230 when the mode change condition is satisfied, and may repeat operations 1210 and 1220 when the mode change condition is not satisfied. For example, whether the mode change condition is satisfied may be determined based on at least one of a user input (e.g., pressing/input/selection of the key 351 (e.g., power key) or button touch/input/selection on a screen), a connection to an external power source (e.g., detection of a VBUS voltage for power supply), and a comparison between a state value (e.g., battery remaining amount/level, internal temperature, or internal element temperature) of the electronic device and a threshold value.

In operation 1230, the electronic device (processor and/or sensor module) may change the firmware of the sensor module from the second version (e.g., lite version) having limited functionality to the first version (e.g., full version). According to one embodiment, the processor may store the first version of firmware in the internal memory of the sensor module. Depending on the command from the processor or the default setting of the sensor module, the sensor module may load the first version of firmware via a booting process. According to one embodiment, for a change from the second mode to the first mode, the processor may perform a normal booting process.

In operation 1240, the electronic device (processor) may acquire the biometric information-related data stored in the internal memory of the sensor module. The processor may accumulate biometric information-related data which is newly detected by the sensor module, with previously acquired biometric information-related data. The processor may transmit the accumulated biometric information-related data to the display. The display may display the accumulated biometric information-related data. For example, the processor may receive data on a first number of steps taken by the user from the sensor module. In the second mode, the processor may accumulate a second number of steps that is newly detected with on the first number of steps. The sensor module may transmit the accumulated number of steps to the display, and the display may display the accumulated number of steps.

Figure 13:
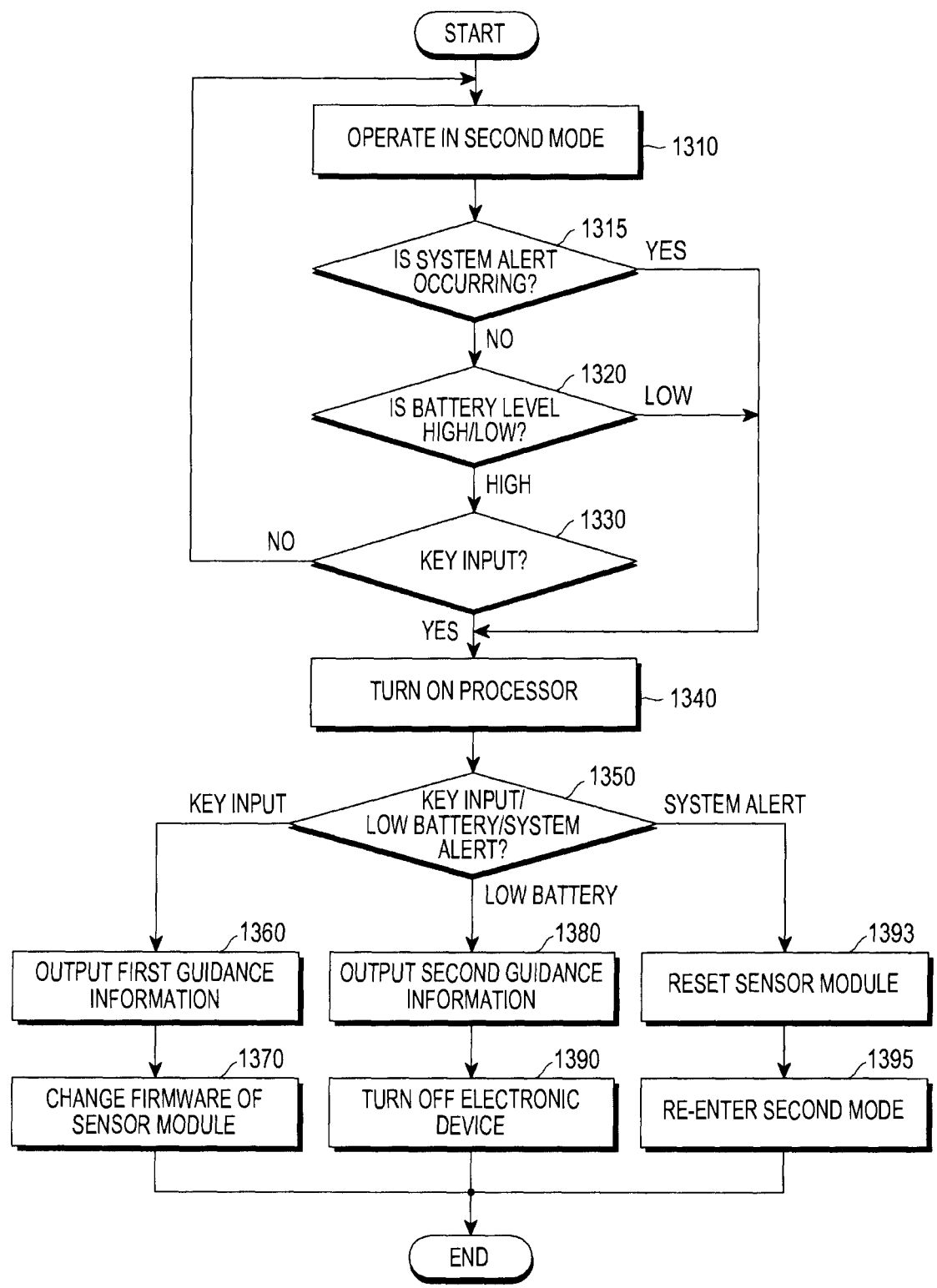
FIG. 13 is a flowchart illustrating a mode change method of an electronic device according to an embodiment.

FIG. 13 is a flowchart illustrating a mode change method of an electronic device according to an embodiment. The mode change method may include operations 1310 to 1395. Each operation/step of the mode change method may be performed by at least one of an electronic device (e.g., the electronic device 101, 301, or 701), a sensor module (e.g., the sensor module 176 or 376), a power management module (e.g., the power management module 188 or 388), at least one processor (e.g., the processor 120 or 320), a display (e.g., the display device 160, the display 360, or the display circuit 761), and a control unit (e.g., a combination of two or more of sensor module, power management module, display, and processor) of the electronic device. According to one embodiment, at least one of operations 1310 to 1395 may be omitted, some operations thereof may be reordered, or other operations may be added.

Hereinafter, the operations 610 to 690 of the mode change method shown in FIG. 6 may respectively correspond to operations 1310 to 1390 of the mode change method, and thus redundant description thereof will be omitted.

In operation 1310, an electronic device (e.g., sensor module and/or display) may operate in the second mode. For example, in the second mode, the processor of the electronic device may be turned off.

In operation 1315, the electronic device (e.g., sensor module or power management module) may determine whether a system alert associated with an operational error of the sensor module is occurring. The electronic device may perform operation 1340 when the system alert occurs and may perform operation 1320 when the system alert does not occur.

In operation 1320, the electronic device (e.g., sensor module or power management module) may determine whether a battery level (i.e. the amount remaining in the battery) is in a high state or a low state. The electronic device may perform operation 1330 when the battery level is in the high state, and may perform operation 1340 when the battery level is in the low state.

In operation 1330, the electronic device (e.g., sensor module or power management module) may determine whether pressing/input/selection of a predetermined key (e.g., the key 351 or a power key) is detected. The electronic device may perform operation 1340 when an input of the key is detected, and may revert to operation 1310 when the input of the key is not detected.

In operation 1340, the electronic device (e.g., power management module) may turn on the processor.

In operation 1350, the electronic device (e.g., processor) may determine whether the reason for the processor to be turned on is due to the input of the key (or detection of the input of the key), low battery, or the system alert. The electronic device may perform operation 1360 when the processor is turned on due to the input of the key, may perform operation 1380 when the processor is turned on due to the low battery, or may perform operation 1393 when the processor is turned on due to the system alert.

In operation 1360, when the processor is turned on due to the input of the key, the electronic device (e.g., processor and/or display circuit) may output first guidance information. For example, the first guidance information may be text such as "exit watch only mode" and/or an image such as a progress bar or an icon indicating the electronic device will transition out of the second mode.

In operation 1370, the electronic device (e.g., processor and/or sensor module) may change the firmware of the sensor module from the second version (e.g., lite version) having limited functionality to the first version (e.g., full version).

In operation 1380, when the processor is turned on due to low battery, the electronic device (e.g., processor and/or display) may output second guidance information. For example, the second guidance information may be text such as "low battery, power off" and/or an image such as a progress bar or an icon indicating the turning off (or powering off) of the electronic device on the display.

In operation 1390, the electronic device may be turned off.

In operation 1393, when the processor is turned on due to the system alert, the electronic device (processor and/or sensor module) may reset the sensor module. For example, the electronic device may turn off the sensor module and then turn on the sensor module again. According to one embodiment, the sensor module may reload the first version or the second version of firmware. According to one embodiment, when the processor is turned on based on the system alert, the user may not be notified that the electronic device is turned on. For example, a silent reboot may be performed.

In operation 1395, the electronic device (processor and/or sensor module) may re-enter the second mode. For example, the electronic device may perform operations 450 and 460 (and operation 440) of the mode change method shown in FIG. 4.

FIGS. 14A to 14G are various diagrams illustrating an operation method of an electronic device according to an embodiment.

Figure 14A:
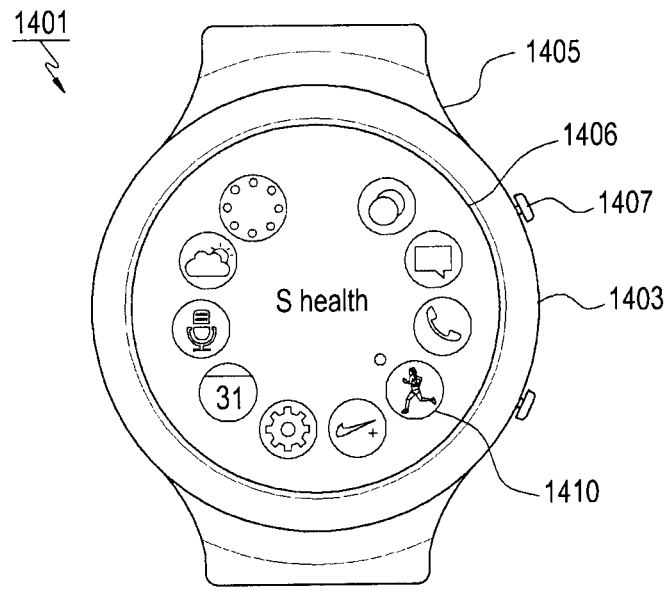
FIG. 14A, FIG. 14B, FIG. 14C, FIG. 14D, FIG. 14E, FIGS. 14F, and 14G are various diagrams illustrating an operation method of an electronic device according to an embodiment.

Referring to FIG. 14A, an electronic device 1401 (e.g., the electronic device 101, 301, or 701) may include a housing 1403 (e.g., the housing 303 or 703), a key 1407 (e.g., the key 351 or 751 or a power key), a display 1406 (e.g., the display device 160, the display 360, or the display circuit 761), and a connection structure 1405. At least a portion of the display 1406 may be disposed in the housing 1403 and be exposed through a portion of the housing 1403. The electronic device 1401 may include the connection structure 1405 (e.g., band or strap) connected to the housing 1403 so that the electronic device 1401 can be worn by a user.

The electronic device 1401 may display, on the display 1406, a screen (or graphical user interface (GUI)) including at least one graphical element 1410 (e.g., text, image, video, or a combination of some/all thereof) in a first mode.

According to one embodiment, the electronic device 1401 may display a home screen. The home screen may be a first screen or a GUI capable of performing user interaction displayed on the display 1406 when the electronic device 1401 is powered on. The home screen may include the at least one graphical element 1410 (e.g., a shortcut icon for executing frequently used applications, time, weather, and biometric information). According to one embodiment, the at least one graphical element 1410 may correspond to biometric information, and the biometric information may include a number of steps, a travel distance, a heart rate, consumed calories, and/or exercise time of the user.

Figure 14B:
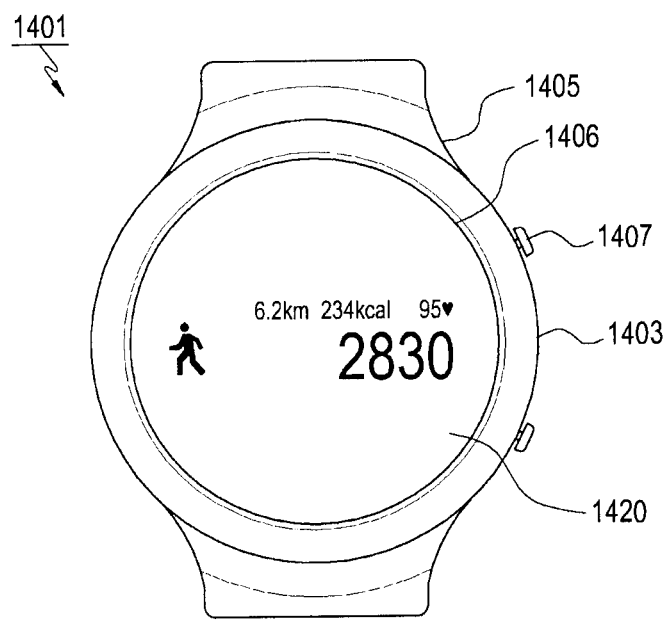

Referring to FIG. 14B, when the graphical element 1410 associated with the biometric information is selected, the electronic device 1401 may display a screen 1420 associated with the biometric information on the display 1406. The screen 1420 associated with the biometric information may include a graphical element that indicates, for example, the type of exercise, exercise time, remaining time, travel distance, consumed calories, user's heart rate, stress level due to exercise, and/or exercise progress.

Figure 14C:
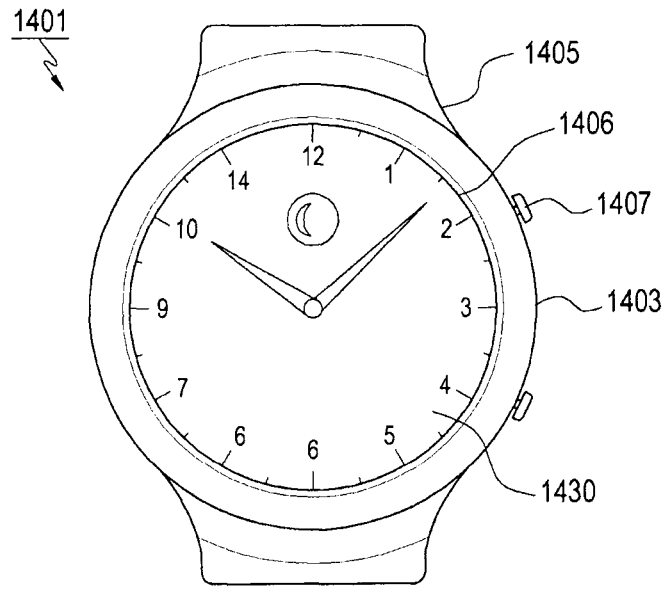

Referring to FIG. 14C, when the mode change condition from the first mode to the second mode is satisfied, the electronic device 1401 may display a watch face image 1430 on the display 1406.

According to one embodiment, whether the mode change condition is satisfied may be determined based on at least one of pressing/input of a user input (e.g., the key 1407 (e.g., power key) or button touch/input on a screen), a connection to an external power source (e.g., detection of a VBUS voltage for power supply), and a comparison between a state value (e.g., battery remaining amount/level, internal temperature, or internal element temperature) of the electronic device 1401 and a threshold value.

Figure 14D:
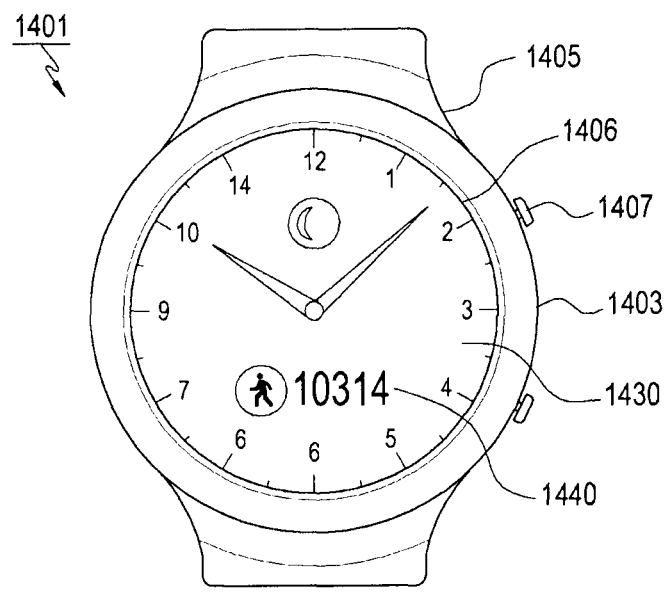

Referring to FIG. 14D, when the mode change condition is satisfied, the electronic device 1401 may display a graphical element 1440 (e.g., showing the number of steps) indicating the biometric information along with the watch face image 1430 on the display 1406.

According to one embodiment, the watch face image 1430 in the second mode may be displayed at least partially differently from the watch face image in the first mode. For example, the watch face image in the first mode may be displayed in full color, and the watch face image 1430 in the second mode may be displayed with limited colors. As another example, a condition (e.g., a displayed time, a displayed illumination, or the like) in which the watch face image in the first mode is displayed may be different from a condition (e.g., a displayed time, a displayed illumination, or the like) in which the watch face image 1430 in the second mode is displayed. As another example, an icon indicating that the electronic device is currently operating in the second mode may be displayed on at least a portion of the watch face image 1430 in the second mode.

Figure 14E:
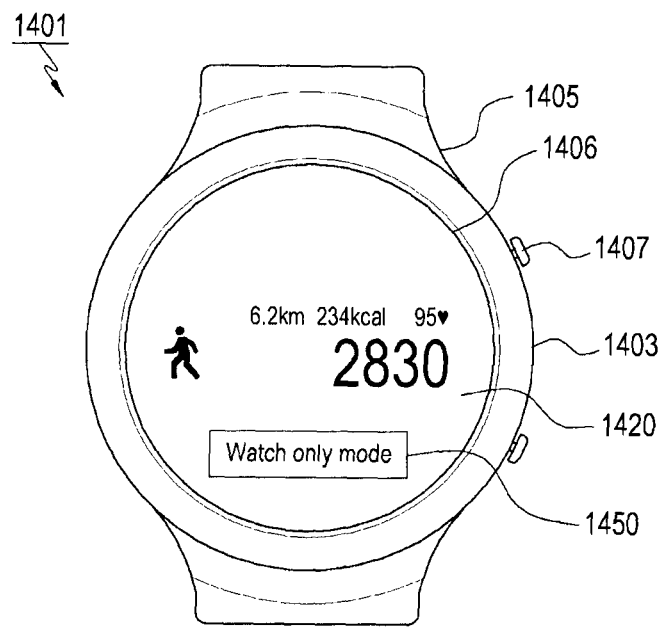

Referring to FIG. 14E, according to one embodiment, when at least a portion of the mode change condition is satisfied, the electronic device 1401 may display, on the display 1406, the graphical element 1450 that allows the user to select entry into the second mode. When a user selects the graphical element 1450, the electronic device 1401 may perform the operation of switching to the second mode, and may display the watch face image 1430 on the display 1406 as shown in FIG. 14C.

Figure 14F:
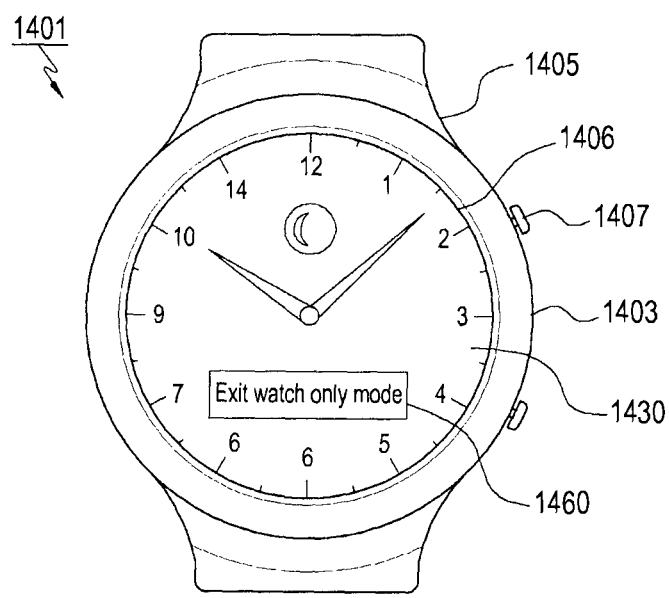
Figure 14G:
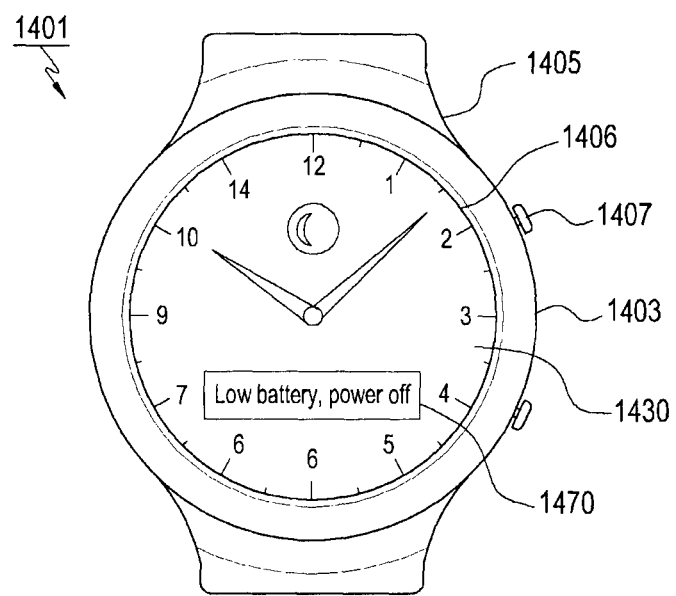

Referring to FIG. 14F, when the mode change condition from the second mode to the first mode is satisfied (e.g., when the key 1407 is pressed or long-pressed), the electronic device 1401 may display first guidance information 1460 (e.g., "exit watch only mode") indicating that the electronic device may transition out of the second mode on the display 1406. According to one embodiment, the electronic device 1401 may display, on the display 1406, another graphical element that, upon user selection, transitions the electronic device from the second mode to the first mode together with the first guidance information 1460.

Referring to FIG. 14Q when the electronic device reaches a low battery condition, the electronic device 1401 may display second guide information 1470 (e.g., "low battery, power off") indicating that the electronic device will be turning off (or powering off).

Figure 15A:
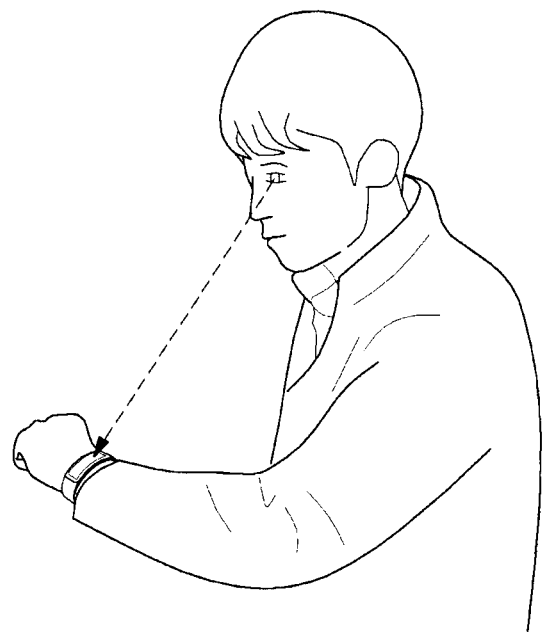
FIG. 15A and FIG. 15B are diagrams illustrating an operation method of an electronic device in a second mode according to an embodiment.
Figure 15B:
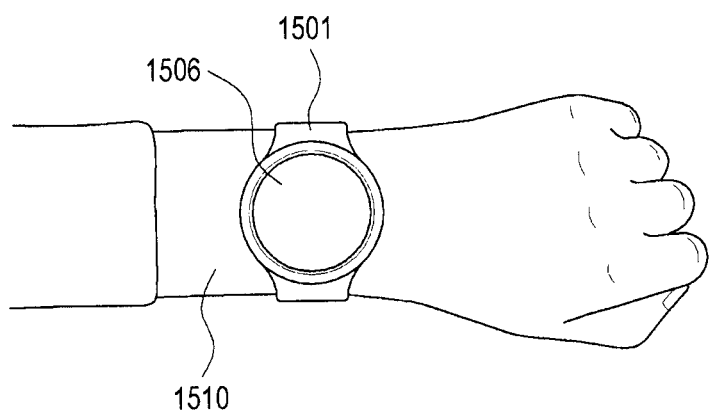

FIGS. 15A and 15B are diagrams illustrating an operation method of an electronic device in a second mode according to an embodiment.

Referring to FIG. 15A, the electronic device 1501 may determine whether a first motion (e.g., resulting from the operation in which the user raises his or her arm 1510) is detected through a motion sensor (e.g., a gyro sensor, an acceleration sensor, and a gyro compass, etc.). When the first motion is detected, the electronic device 1501 may activate the display 1506, and may display, on the display 1506, image data (e.g., watch face image and/or biometric information-related image), time-related data (e.g., watch face image, current time information, and/or mode/image identification information associated with time display), and biometric information-related data (e.g., type of exercise, exercise time, remaining time, travel distance, consumed calories, user's heart rate, stress level due to exercise, or exercise progress). For example, when the first motion is detected, the electronic device 1501 may activate the display 1506 and may display the watch face image 1430 on the display 1506 as shown in FIG. 14C.

Referring to FIG. 15B, the electronic device 1501 may determine whether a second motion (e.g., resulting from the operation in which a user lowers his or her arm 1510) is detected through the motion sensor. When the second motion is detected, the electronic device 1501 may deactivate the display 1506.

According to various embodiments, in a storage medium storing instructions, the instructions may be configured to cause at least one circuit to perform at least one operation when executed by the at least one circuit. The at least one operation includes an operation of turning off the processor of the electronic device according to a change from the first mode to the second mode, an operation of detecting biometric information-related data using the sensor circuit of the electronic device, and an operation of displaying at least one of time-related data and the biometric information-related data on the display of the electronic device.

Certain aspects of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
a housing configured to house a battery;
a display disposed in the housing, exposed through a portion of the housing, and configured to electrically connect to the battery;
at least one sensor comprising a motion detection sensor circuit disposed in the housing and configured to electrically connect to the battery;
a power management circuit disposed in the housing and configured to electrically connect to the battery; and
a processor functionally or electrically connected to the motion detection sensor circuit and the display, and electrically connected to the power management circuit through a switch that is turned on when the processor is in a first mode and turned off when the processor is in a second mode,
wherein, in the first mode, the processor is configured to:
control the display to display first image data in response to first detection of a first motion by the motion detection sensor circuit, and
wherein, in the second mode, the processor is turned off and the at least one sensor is configured to control the display to display second image data in response to second detection of a second motion by the motion detection sensor circuit.

2. The electronic device of claim 1, wherein the motion detection sensor circuit includes an inertial measurement unit (IMU), another processor functionally or electrically connected to the IMU, and a memory functionally or electrically connected to the processor.

3. The electronic device of claim 1, further comprising:
at least one connection structure connected to the housing so that the electronic device can be worn by a user of the electronic device.

4. The electronic device of claim 1, wherein the electronic device is a smart watch.

5. The electronic device of claim 1, wherein the second image data includes a watch face image.

6. A storage medium of an electronic device storing instructions, wherein the instructions, when executed by at least one circuit, cause the at least one circuit to perform at least one operation, wherein the at least one operation comprises:
turning off a processor of the electronic device according to a change from a first mode of the electronic device to a second mode;
detecting biometric information-related data using a sensor circuit of the electronic device; and
displaying at least one of time-related data and the biometric information-related data on a display of the electronic device,
wherein, in the first mode, displaying, by the processor, first image data in response to first detection of a first motion by the sensor circuit, and
wherein, in the second mode, the processor is turned off and displaying, by the sensor circuit, second image data in response to second detection of a second motion by the sensor circuit.

7. The storage medium of claim 6, wherein information about a motion detected by the sensor circuit in the first mode is transmitted to the processor, and information about a motion detected by the sensor circuit in the second mode is transmitted to the display.

8. The storage medium of claim 6, wherein the at least one operation further comprises controlling the processor to transmit the time-related data or the biometric information-related data to the sensor circuit prior to the processor being turned off according to the change from the first mode to the second mode.

9. The storage medium of claim 6, wherein the at least one operation further comprises:
   detecting a motion associated with the electronic device using the sensor circuit in the second mode, and
   deactivating the display in response to the detection of the motion.

10. The storage medium of claim 6, wherein the at least one operation further comprises changing a first firmware of the sensor circuit to a second firmware having limited functionality according to the change from the first mode to the second mode.

11. The storage medium of claim 10, wherein the at least one operation further comprises:
   detecting a key input, and
   changing the second firmware of the sensor circuit to the first firmware in response to the key input.

12. The storage medium of claim 6, wherein the biometric information-related data includes information associated with a number of steps taken by a user of the electronic device.

13. An electronic device comprising:
   a housing;
   a display disposed in the housing and exposed through a portion of the housing;
   at least one sensor circuit comprising a motion detection sensor circuit disposed in the housing; and
   a processor functionally or electrically connected to the motion detection sensor circuit and the display, wherein the processor is configured to be turned on in a first mode, and to be turned off in a second mode,
   wherein, in the first mode, the processor is configured to:
      control the display to display first image data in response to first detection of a first motion by the at least one sensor circuit, and
   wherein, in the second mode, the processor is turned off and at least one sensor is configured to control the display to display second image data in response to second detection of a second motion by the motion detection sensor circuit.

14. The electronic device of claim 13, wherein:
   information about a second motion detected by the motion detection sensor circuit in the first mode is transmitted to the processor, and
   information about the first motion detected by the motion detection sensor circuit in the second mode is transmitted to the display.

15. The electronic device of claim 13, wherein the processor is configured to transmit the data to the motion detection sensor circuit prior to the processor being turned off in the second mode.

16. The electronic device of claim 13, wherein, in the second mode, the motion detection sensor circuit is configured to:
   detect a third motion associated with the electronic device; and
   deactivate the display in response to the detection of the third motion.

17. The electronic device of claim 13, wherein the processor is configured to change a first firmware of the motion detection sensor circuit to a second firmware having limited functionality when the processor changes from the first mode to the second mode.

18. The electronic device of claim 17, wherein the processor is configured to:
   detect a key input; and
   change the second firmware of the motion detection sensor circuit to the first firmware in response to the key input.

19. The electronic device of claim 13, wherein the second image data includes at least one of image data, time-related data, and biometric information-related data.

* * * * *